US012584862B2

(12) United States Patent     (10) Patent No.:   US 12,584,862 B2

Moreau et al.     (45) Date of Patent:    Mar. 24, 2026

(54) REFRACTORY LANCE ASSEMBLY AND REFRACTORY LANCE TUBE

(71) Applicant: NATIONAL RESEARCH COUNCIL OF CANADA, Ottawa (CA)

(72) Inventors: André Moreau, Saint-Bruno-de-Montarville (CA); André Hamel, Saint-Hubert (CA); Mohamad Sabsabi, Longueuil (CA)

(73) Assignee: NATIONAL RESEARCH COUNCIL OF CANADA, Ottawa (CA)

( * ) Notice: Subject to any disclaimer, the term of this patent is extended or adjusted under 35 U.S.C. 154(b) by 99 days.

(21) Appl. No.: 18/294,489

(22) PCT Filed: Aug. 4, 2022

(86) PCT No.: PCT/CA2022/051185

§ 371 (c)(1),
(2) Date: Feb. 1, 2024

(87) PCT Pub. No.: WO2023/010215

PCT Pub. Date: Feb. 9, 2023

(65) Prior Publication Data

US 2024/0344995 A1    Oct. 17, 2024

Related U.S. Application Data

(60) Provisional application No. 63/229,749, filed on Aug. 5, 2021.

(51) Int. Cl.
   *G01N 21/71*     (2006.01)
   *G01N 21/03*     (2006.01)
   *G01N 21/09*     (2006.01)

(52) U.S. Cl.
   CPC ........... *G01N 21/718* (2013.01); *G01N 21/09* (2013.01); *G01N 2021/0342* (2013.01); *G01N 2021/0378* (2013.01); *G01N 2201/06113* (2013.01)

(58) Field of Classification Search
   CPC ................. G01N 21/09; G01N 21/718; G01N 2021/0342; G01N 2021/0378
   See application file for complete search history.

(56) References Cited

U.S. PATENT DOCUMENTS 4,550,898 A    11/1985   LaBate
4,721,534 A    1/1988   Phillippi et al.
(Continued)

FOREIGN PATENT DOCUMENTS

BE     802365 A    11/1973
CA    1258371 A    8/1989
(Continued)

OTHER PUBLICATIONS

Laszlo Peter et al. "Liquid Steel Analysis With Laser-Induced Breakdown Spectrometry in the Vacuum Ultraviolet" Oct. 20, 2003 vol. 42, No. 30, pp. 6199-6204.
(Continued)

*Primary Examiner* — Michael A Lyons
(74) *Attorney, Agent, or Firm* — Merizzi Ramsbottom

(57) ABSTRACT

Described are various embodiments of a refractory lance assembly and a composite refractory lance. In one embodiment, a refractory lance assembly is provided that comprises: an immersion tube having an immersion tip immersible within a melt and an extension tube coupled at an opposed end thereof to form a longitudinally extended composite tube therewith defining an optical path therein, wherein said longitudinally extended composite tube is injectable, in use, with an inert gas to form and probe an (Continued)

immersed melt surface. The assembly further comprises a shroud longitudinally encasing the composite tube and injectable with inert gas to mitigate fluid contamination of the composite tube and immersed melt surface.

20 Claims, 8 Drawing Sheets

(56)                    References Cited

U.S. PATENT DOCUMENTS

| | | | |
|---|---|---|---|
| 4,737,038 A | | 4/1988 | Dostoomian |
| 4,986,658 A | | 1/1991 | Kim |
| 5,591,894 A | * | 1/1997 | Falk .......................... G01N 7/10 |
| | | | 73/864.34 |
| 5,772,324 A | * | 6/1998 | Falk ....................... G01K 1/125 |
| | | | 374/E1.017 |
| 6,909,505 B2 | | 6/2005 | Lucas et al. |
| 2009/0262345 A1 | | 10/2009 | Gruber et al. |
| 2013/0322489 A1 | | 12/2013 | Cuypers et al. |
| 2020/0116642 A1 | * | 4/2020 | Zabrodin ................ G01J 3/443 |

FOREIGN PATENT DOCUMENTS

| | | | |
|---|---|---|---|
| DE | 2626982 A1 | 12/1976 | |
| DE | 2934292 A1 | 6/1980 | |
| DE | 3033391 A1 | 4/1982 | |
| DE | 2912195 C2 | 4/1986 | |
| DE | 4443407 A1 | 6/1995 | |
| DE | 10029948 A1 | 12/2001 | |
| EP | 1760419 A1 | 3/2007 | |
| FR | 2253211 B1 | 11/1977 | |
| FR | 2402006 B1 | 3/1979 | |
| FR | 2394775 B1 | 12/1979 | |
| FR | 2398804 B1 | 4/1980 | |
| FR | 2349810 B1 | 11/1981 | |
| FR | 2345428 B1 | 7/1982 | |
| GB | 2154315 B | 12/1987 | |
| IT | 1087653 B | 6/1985 | |
| JP | S5719342 A | 2/1982 | |
| JP | S59157539 A | 9/1984 | |
| JP | H01201084 A | 8/1989 | |
| JP | H03180416 A | 8/1991 | |
| JP | H07103666 A | 4/1995 | |
| JP | 2000034516 A | 2/2000 | |
| JP | 2005264186 A | 9/2005 | |
| JP | 3920950 B2 | 5/2007 | |
| PL | 324470 A1 | 8/1999 | |

OTHER PUBLICATIONS

Monfort et al, "Development of an on-line LIBS-based sensor for monitoring the hot metal composition in the blast furnace runners", 415-422, CRM Group, Liege, Belgium.

Monfort et al., "On-line measurement of the hot metal temperature and composition in the blast furnace runners by LIBS", Aug. 31, 2014, 1-6, 1, J.Appl.Las.Spectrosc.

Monfort et al., LIBS on-line measurement of the hot metal composition in the blast furnace runners, CETAS 2015 Session 21, May 19-21, 2015, Düsseldorf.

Moreau et al., "Laser-induced breakdown spectroscopy of molten matte", Canadian Institute of Mining Metallurgy and Petroleum Journal, vol. 9, No. 2, Apr. 15, 2018 (Apr. 15, 2018).

Extended European Search Report stemming from European Patent Application 22851519.3 dated May 19, 2025, 23 pages.

* cited by examiner

200
104
110
202
204
300
_Fig. 4_

FIG_5

_FIG_6 wt % Si and wt % Mn as measured by lab analysis wt % Si and wt % Mn as measured by lab analysis

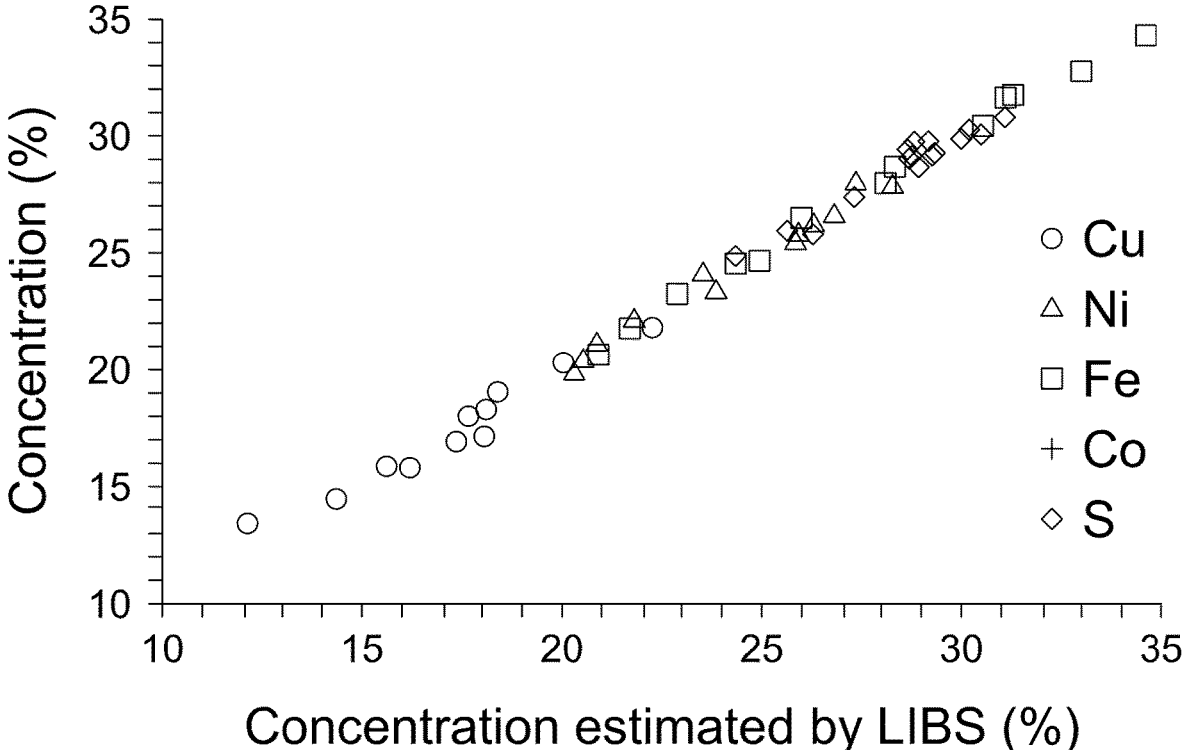
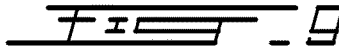

REFRACTORY LANCE ASSEMBLY AND REFRACTORY LANCE TUBE

CROSS REFERENCE TO RELATED APPLICATIONS

This application is a national phase entry of International Patent Application No. PCT/CA2022/051185 filed Aug. 4, 2022, which claims priority to U.S. Provisional Patent Application No. 63/229,749 filed Aug. 5, 2021 and entitled "REFRACTORY LANCE ASSEMBLY AND REFRACTORY LANCE TUBE", the entire disclosures of each of which are hereby incorporated herein by reference.

FIELD OF THE DISCLOSURE

The present disclosure relates to pyrometallurgical processes and monitoring, and, in particular, to a refractory lance assembly and a refractory lance tube.

BACKGROUND

In different pyrometallurgical processes, the timely determination of chemical compositions of molten materials is essential to achieve efficient process control. Typically, a quantitative determination of specific constituent elements is required to inform operational parameter adjustments, in turn to obtain a product of desired composition or character. However, the harsh conditions inherent to pyrometallurgical processes, including high temperatures, make direct compositional measurement of molten materials difficult. This is particularly true in the iron and steel industries, where molten material flows in the order of 1500° C. or more are common.

Several methods for compositional measurement of molten materials with high melting points are available. For example, the simplest method involves acquiring a sample from a bath of molten material, allowing it to cool or be quenched, laboriously preparing it for analysis and finally, analysing composition using offline laboratory equipment. One drawback of this method is the time delay (ranging from minutes to hours) which inevitably arises between sample acquisition and the determination of composition. In addition, due to the offline nature of the method, real-time and/or continuous compositional measurement of molten materials is not possible, and thus operators must select discrete points in time for measurement, dependent on the particular application.

To obtain more continuous compositional measurements on molten materials with high melting points, a variety of indirect sensing means can be utilised. Indirect sensing involves the measurement of properties that are less complicated to obtain as compared to direct compositional measurements, such as molten material temperatures, oxygen activity or off-gas compositions, and utilising known material relationships to relate such indirectly-measured properties back to the composition of the molten material. Indirect methods are limited in terms of accuracy. For example, certain indirect methods, such as the measurement of temperature, are only relevant to the measurement of select elements or compounds heavily influenced by temperature. Furthermore, reliance on certain assumptions (e.g. the assumption of thermodynamic equilibrium), can lead to errors in calculated composition (e.g. by ignoring the effect of kinetics).

Therefore, to provide direct, real-time, and continuous compositional measurement of molten materials, laser-induced breakdown spectroscopy (LIBS) can be used. In its typical configuration, LIBS involves repetitively emitting short, high energy laser pulses from a remote location towards a target spot of molten material to ablate or vaporise matter to form a plasma. The plasma emits electromagnetic radiation which is analyzed via a spectrometer, and, like other spectroscopic techniques, this analysis is correlated to elemental composition and/or concentrations through analysis of the spectral signature of the plasma. One drawback of systems using traditional LIBS to perform compositional measurement of molten materials is that melt surfaces are often metallurgically distinct from the bulk melt, and could therefore fail to provide suitably representative measurements of the bulk melt. This can be due to a variety of reasons, such as reactions that occur between the surface material of the melt and the atmosphere (e.g. oxidisation), or residual slag, feed and other impurities floating on the surface of the melt.

To counter this, some LIBS approaches involve inserting a lance into the melt, generally filled with an inert gas, and directing the laser pulse through the lance. When inserting a lance into a melt, there is typically just enough pressure in the lance to balance the hydrostatic pressure of the molten material at the point of measurement, while keeping the surface of the melt relatively static. Compositional measurement on a relatively static surface simplifies the LIBS measurement but introduces other metallurgical problems. Chiefly, molten material (particularly metal) is generally heterogenous, consisting of a variety of prills, inclusions and the like. As such, measurement of a stagnant surface can again fail to be representative of the bulk melt, especially where the molten bath is stagnant.

To this end, U.S. Pat. No. 6,909,505, issued Jun. 21, 2005 to Lucas et al. describes a "bubbling approach", which consists of inserting a tip of a lance into a molten material (beneath slag), flowing gas through the lance to bubble at the end thereof into the molten material, and then measuring composition on the internal surface of the bubble with LIBS. As such, the bubbling approach offers a method for obtaining real-time, inline compositional measurements of molten materials. While the bubbling approach introduces its own challenges, such as random fluctuations from the bubbles causing fluctuations in plasma-emitted light received at the detector, it is considered superior from a metallurgical perspective, as the measurement surface is constantly refreshed with new material from the bulk melt. This bubbling approach has been effective for molten aluminium, zinc, lead and other low melting point metals, typically having melting temperatures up to 1000° C.

Existing lances for real-time, continuous LIBS compositional measurement, such as those utilised in the bubbling approach, suffer serious drawbacks at high temperatures, including low mechanical strength, thermal shock during insertion into melt, corrosion by molten materials and/or slag, and chemical reactivity in the melt conditions. For example, such lances are typically manufactured of porous ceramics, such as alumina, which exhibit corrosion resistance and thermal shock resistance. However, as the pore size of porous ceramics can differ from between 6 nm to 500 μm, these lances are generally permeable which is problematic, particularly where sensitive LIBS measurements are to be taken. Other known lances are manufactured of fused silica or SiAlON II, both of which are insufficiently corrosion and thermal shock resistant at high temperatures. Yet other known lances require additional cooling mechanisms to withstand high temperatures, which present safety hazards and are therefore undesirable.

This background information is provided to reveal information believed by the applicant to be of possible relevance. No admission is necessarily intended, nor should be construed, that any of the preceding information constitutes prior art or forms part of the general common knowledge in the relevant art.

SUMMARY

The following presents a simplified summary of the general inventive concept(s) described herein to provide a basic understanding of some aspects of the disclosure. This summary is not an extensive overview of the disclosure. It is not intended to restrict key or critical elements of embodiments of the disclosure or to delineate their scope beyond that which is explicitly or implicitly described by the following description and claims.

A need exists for a refractory lance assembly and a refractory lance tube, that overcome some of the drawbacks of known techniques, or at least, provides a useful alternative thereto. Some aspects of this disclosure provide examples of a refractory lance assembly and a refractory lance tube, accordingly.

In accordance with one aspect, there is provided a refractory lance assembly to be utilised with an optical sensing system to optically probe a melt. The refractory lance assembly comprises an immersion tube having an immersion tip immersible within the melt and an extension tube coupled at an opposed end thereof to form a longitudinally extended composite tube defining an optical path therein for optical alignment with the optical sensing system. The longitudinally extended composite tube is injectable, in use, with an inert gas to form an immersed melt surface within the melt via the immersion tip so to optically probe said immersed melt surface as exposed to said inert gas via said optical path. The refractory lance assembly also comprises a shroud longitudinally encasing the longitudinally extended composite tube to define an encasing volume therebetween. The coupling of the extension tube with the opposed end of the immersion tube is encased within the encasing volume, whereas the immersion tip extends longitudinally therefrom for immersion within the melt. The encasing volume is injectable with the inert gas to mitigate fluid contamination of the longitudinally extended composite tube and immersed melt surface via the coupling.

In one embodiment, the shroud coaxially encases the longitudinally extended composite tube.

In one embodiment, the shroud longitudinally extends beyond the coupling toward the immersion tip by at least one inch.

In one embodiment, the shroud longitudinally extends beyond the coupling toward the immersion tip by at least two inches.

In one embodiment, the immersion tube and the extension tube have similar coefficients of thermal expansion.

In one embodiment, the immersion tube is corrosion resistant and thermal shock resistant to maintain structural integrity at a temperature of at least 1500° C., whereas the extension tube is defined by a comparatively lower corrosion and thermal shock resistance.

In one embodiment, the opposed end of the immersion tube is snugly received within a coupling end of the extension tube, or vice versa.

In one embodiment, the immersion tube comprises a non-porous ceramic cylinder.

In one embodiment, the non-porous ceramic cylinder is manufactured of any one of: boron nitride, boron nitride with at least 40% zirconium dioxide (zirconia), or zirconia silicate boron nitride (ZSBN) comprising approximately 45% zirconia in a matrix of boron nitride and borosilicate glass.

In one embodiment, at least the immersion tip of the immersion tube comprises a ceramic cylinder coated by an insulating non-porous ceramic layer.

In one embodiment, the ceramic cylinder comprises aluminum oxide (alumina).

In one embodiment, the insulating non-porous ceramic layer is manufactured of any one of: boron nitride, boron nitride with at least 40% zirconia, or ZSBN comprising approximately 45% zirconia in a matrix of boron nitride and borosilicate glass.

In one embodiment, the extension tube comprises a metal cylinder manufactured of any one or more of: molybdenum, chromium, iridium, niobium, osmium, tungsten, tantalum, or alloys thereof.

In one embodiment, the extension tube comprises a non-porous ceramic cylinder manufactured of any one or both of: SiAlON, or SiAlON II.

In one embodiment, the longitudinally extended composite tube further comprises a coupler at the coupling between the immersion tube and the extension tube, wherein the coupler is manufactured of any one or both of: borosilicate, or calcium borate.

In one embodiment, the longitudinally extended composite tube further comprises a coupler coupling the immersion tube and the extension tube, wherein the coupler comprises one or more ferrules into which ends of the immersion tube and the extension tube can be received such that the one or more ferrules form an insulating sheath covering the coupling.

In one embodiment, the extension tube is reusable in two or more thermal cycles, whereas the immersion tube is replaceable with one or more alternative immersion tubes.

In one embodiment, the inert gas within the encasing volume is pressurized to release toward the melt to reduce melt surface oxidation.

In one embodiment, the inert gas comprises argon gas.

In one embodiment, the optical sensing system comprises a laser-induced breakdown spectroscopy (LIBS) system, the optical measurements comprise LIBS compositional measurements, and the optical path terminates in an optical window in optical alignment with the LIBS system.

In one embodiment, the melt comprises at least partially molten iron, steel, nickel, copper, platinum, or alloys thereof.

In accordance with another aspect, there is provided a refractory lance tube for optically probing a melt, comprising: an immersion tube having an immersion tip immersible within the melt, and an extension tube coupled at an opposed end thereof to form a longitudinally extended composite tube therewith defining an optical path therein; wherein the immersion tube is at least partially manufactured of a non-porous ceramic, which is substantially resistant to corrosion and thermal shock at temperatures of at least 1500° C.

In one embodiment, the immersion tube is releasably coupled to the extension tube to be replaced with at least one alternative immersion tube.

In one embodiment, the non-porous ceramic comprises any one or more of: boron nitride, boron nitride with at least 40% zirconium dioxide (zirconia), or zirconia silicate boron nitride (ZSBN) comprised of approximately 45% zirconia in a matrix of boron nitride and borosilicate glass.

In one embodiment, the extension tube is manufactured of a metal.

In one embodiment, the metal comprises any one or more of: molybdenum, chromium, iridium, niobium, osmium, tungsten, tantalum, or alloys thereof.

In one embodiment, the longitudinally extended composite tube further comprises a coupler between the immersion tube and the extension tube, wherein the coupler is manufactured of any one or both of: borosilicate, or calcium borate.

In one embodiment, the immersion tube comprises an aluminum oxide (alumina) tube at least partially coated at the immersion tip with the non-porous ceramic.

In one embodiment, the melt comprises at least partially molten iron, steel, nickel, copper, platinum, or alloys thereof.

Other aspects, features and/or advantages will become more apparent upon reading of the following non-restrictive description of specific embodiments thereof, given by way of example only with reference to the accompanying drawings.

BRIEF DESCRIPTION OF THE FIGURES

Several embodiments of the present disclosure will be provided, by way of examples only, with reference to the appended drawings, wherein:

FIG. 4 is a cross-sectional view of the refractory lance assembly shown in FIGS. 2 and 3, at section D-D as indicated in FIG. 2;

FIG. 9 is a graph of compositional measurements, specifically constituent concentration, for a given melt sample, performed with a conventional laboratory technique (x-axis) and with LIBS using a refractory lance assembly (y-axis), in accordance with a further embodiment, in another experiment, showing comparable results were obtained.

Figure 1:
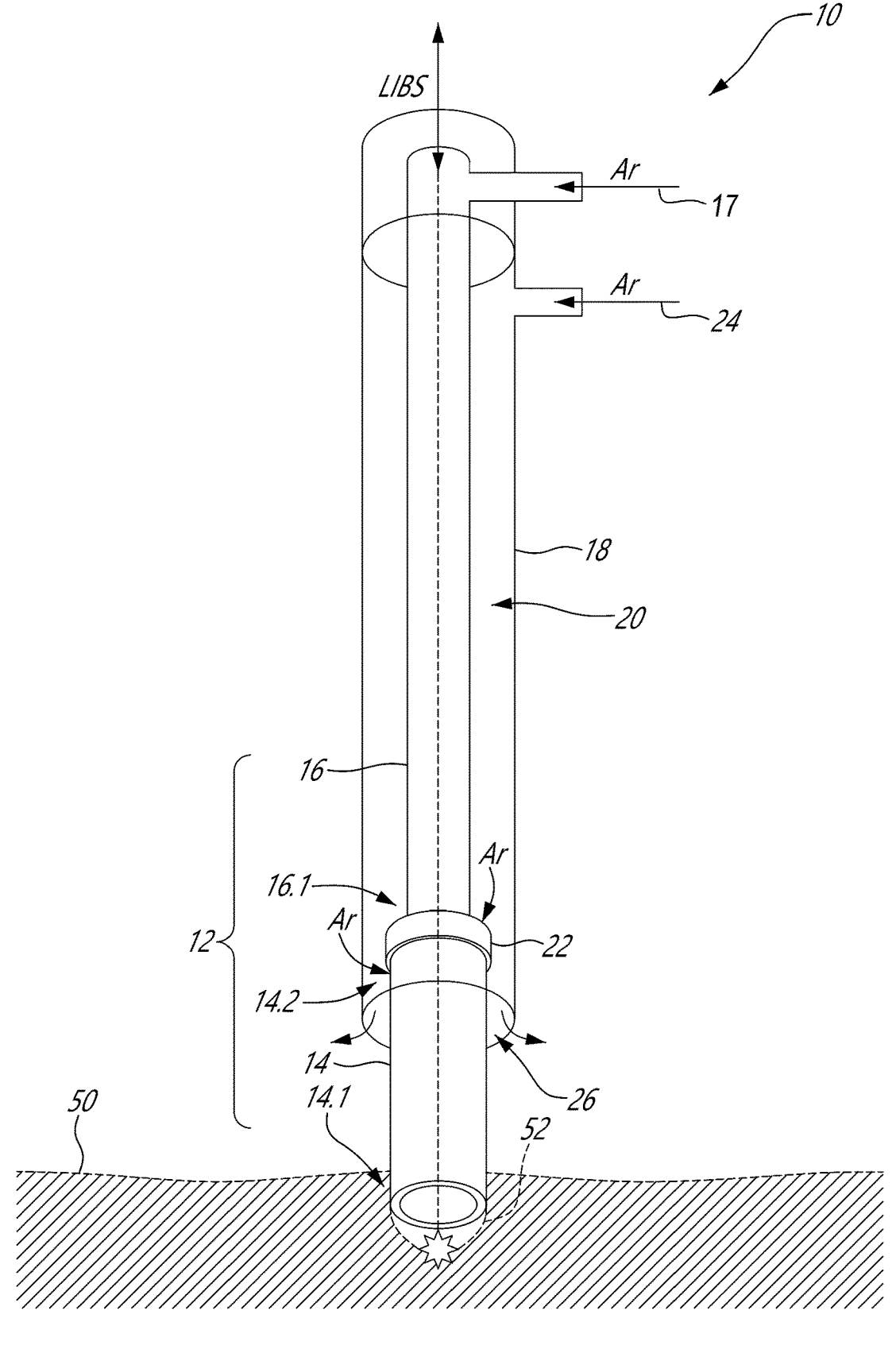
FIG. 1 is a schematic diagram of a refractory lance assembly, in accordance with one embodiment, wherein a sleeve or shroud surrounding a composite tube is open at one end.
Figure 2:
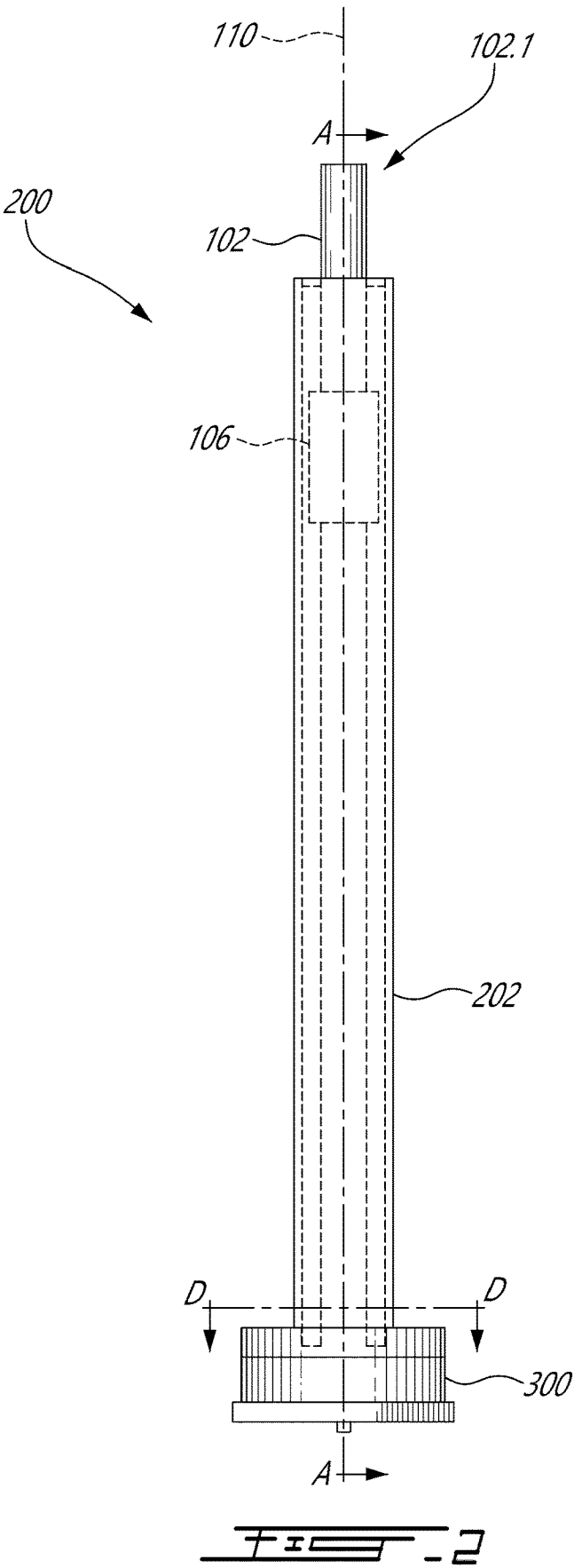
FIG. 2 is a side view of a refractory lance assembly, in accordance with another embodiment, wherein a sleeve or shroud surrounding a composite tube is closed at one end.
Figure 3:
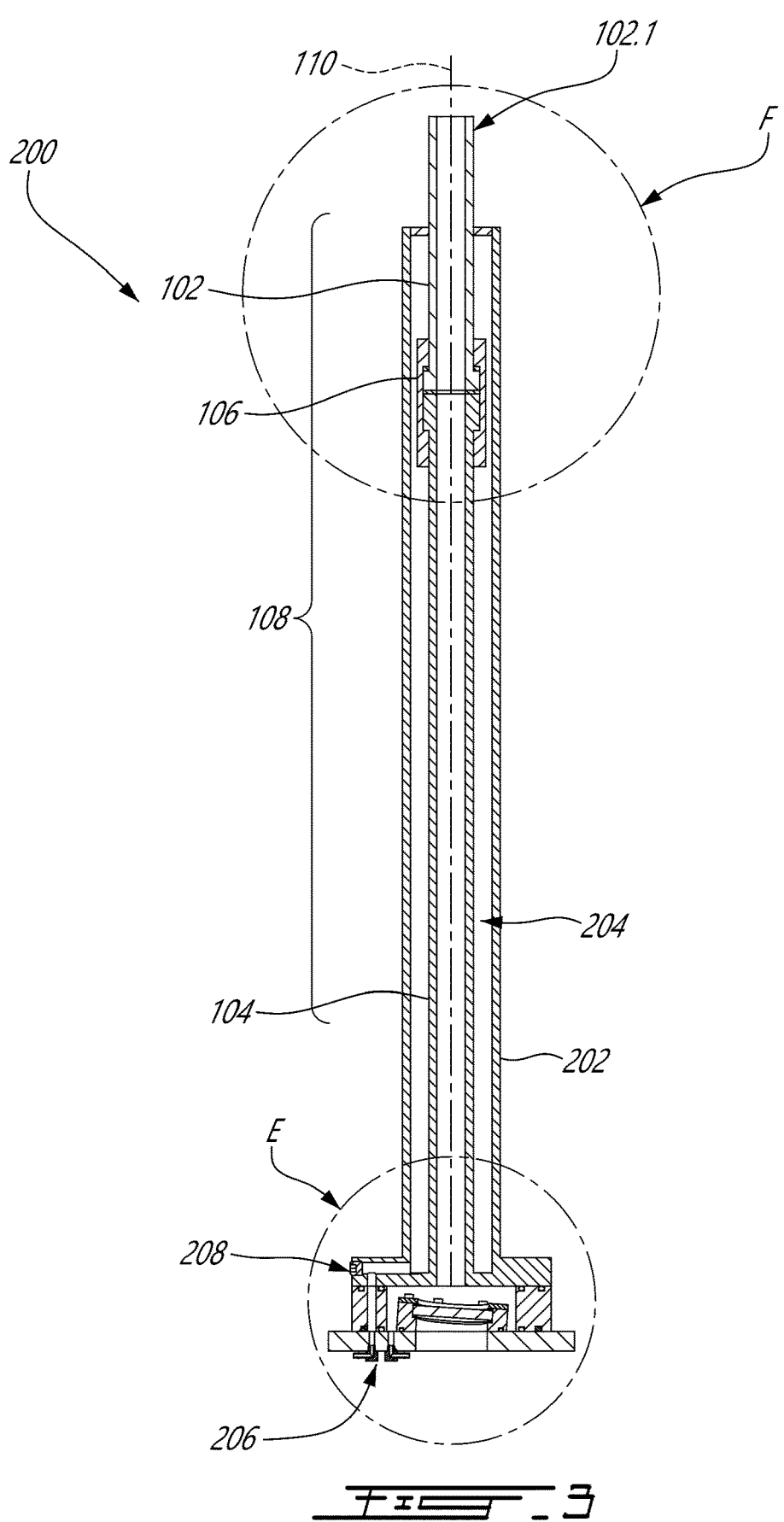
FIG. 3 is a longitudinal cross-sectional view of the refractory lance assembly shown in FIG. 2, at section A-A as indicated therein, revealing a coupling between first and second tubes.
Figure 5:
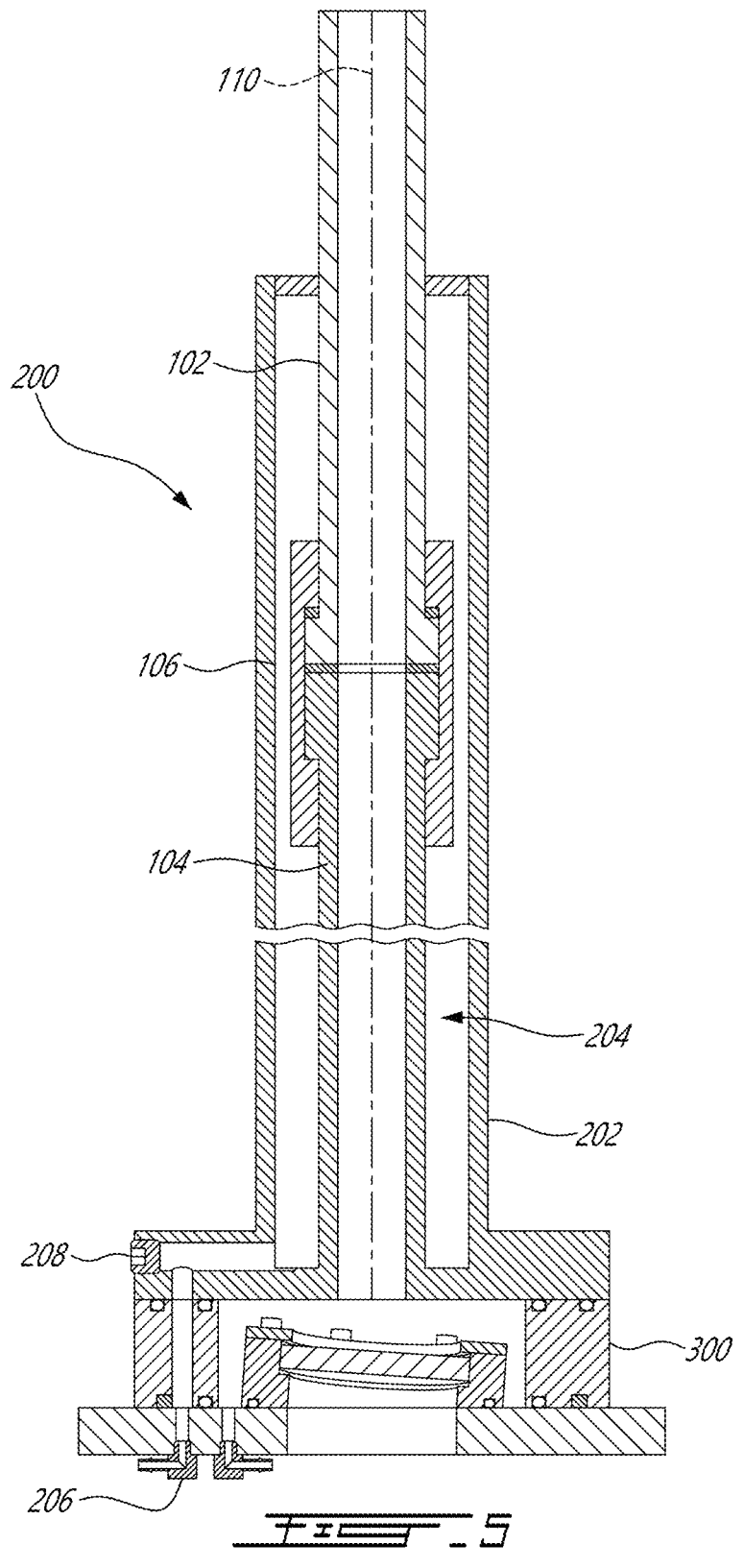
FIG. 5 is an enlarged view of the refractory lance assembly shown in FIGS. 2 to 4, illustrating detail sections E and F as indicated in FIG. 3, and indicating that the length of the second tube is variable.
Figure 6:
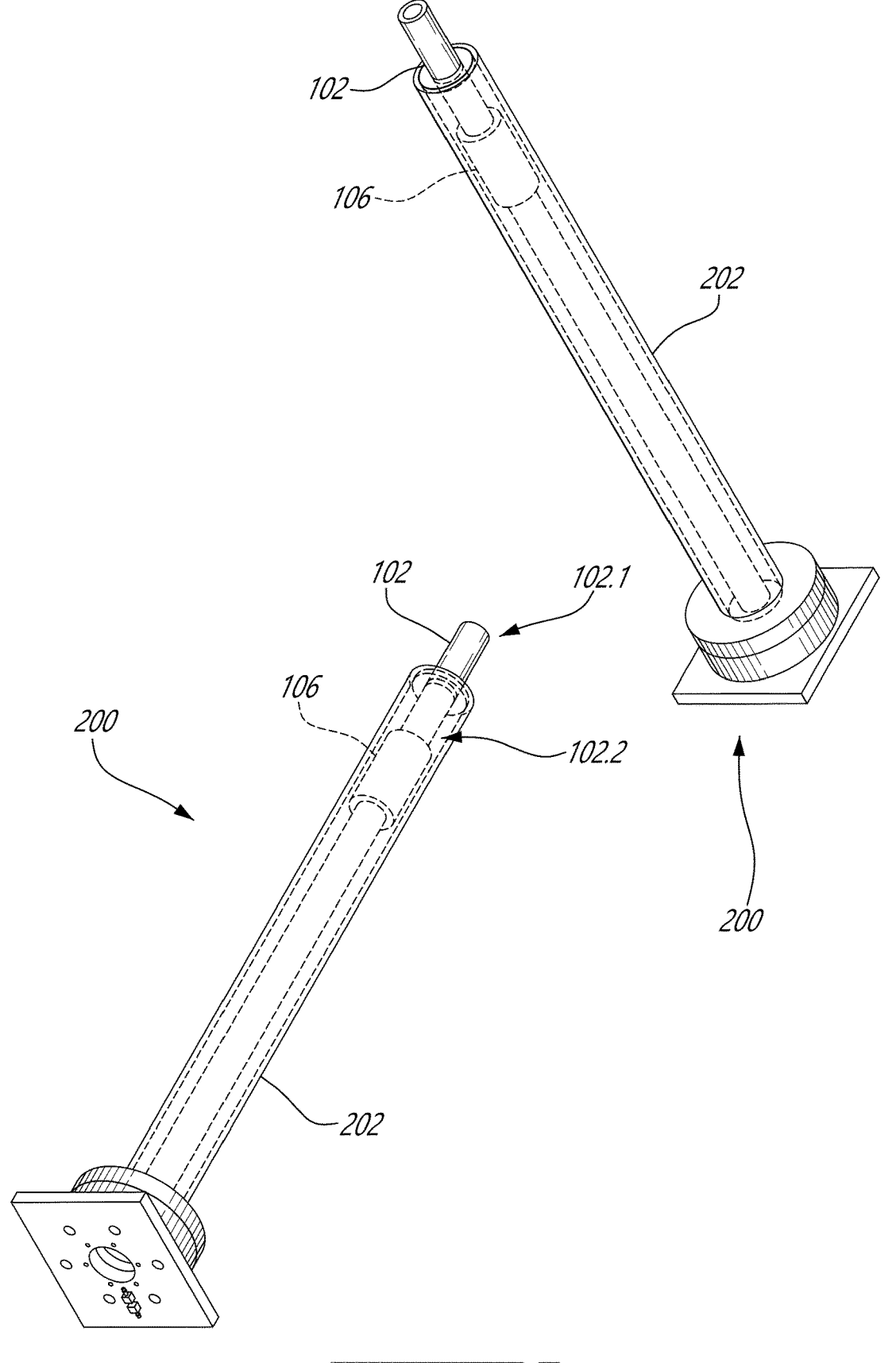
FIG. 6 is respective bottom and top perspective views of the refractory lance assembly shown in FIGS. 2 to 5, showing the composite tube with its coupling encased by the sleeve or shroud.

Elements in the figures are illustrated for simplicity and clarity and have not necessarily been drawn to scale. For example, the dimensions of some of the elements in the figures may be emphasized relative to other elements to facilitate understanding of the various presently disclosed embodiments. Also, common, but well-understood elements that are useful or necessary in commercially feasible embodiments are often not depicted in order to facilitate a less obstructed view of the various presently disclosed embodiments.

DETAILED DESCRIPTION

Various implementations and aspects of the specification will be described with reference to details discussed below. The following description and drawings are illustrative of the specification and are not to be construed as limiting the specification. Numerous specific details are described to provide a thorough understanding of various implementations of the present specification. However, in certain instances, well-known or conventional details are not described in order to provide a concise discussion of implementations of the present specification.

Various devices, apparatuses, systems and processes will be described below to provide examples of implementations of the instant disclosure. No implementation described below limits any claimed implementation and any claimed implementations may cover processes or apparatuses that differ from those described below. The claimed implementations are not limited to apparatuses or processes having all of the features of any one apparatus or process described below or to features common to multiple or all of the apparatuses or processes described below. It is possible that an apparatus or process described below is not an implementation of any claimed subject matter.

Furthermore, numerous specific details are set forth in order to provide a thorough understanding of the implementations described herein. However, it will be understood by skilled artisans that the implementations described herein may be practiced without these specific details. In other instances, well-known methods, procedures and components have not been described in detail so as not to obscure the implementations described herein. This may include, for example, optical sensing systems, such as conventional LIBS systems.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is structured to perform the function, or is otherwise capable of performing the function.

It is understood that for the purpose of this specification, language of "at least one of X, Y, and Z" and "one or more of X, Y and Z" may be construed as X only, Y only, Z only, or any combination of two or more items X, Y, and Z (e.g., XYZ, XY, YZ, ZZ, and the like). Similar logic may be applied for two or more items in any occurrence of "at least one . . . " and "one or more . . . " language.

Unless defined otherwise, all technical and scientific terms used herein have the same meaning as commonly understood by one of ordinary skill in the art to which this disclosure belongs.

Throughout the specification and claims, the following terms take the meanings explicitly associated herein, unless the context clearly dictates otherwise. The phrase "in one of the embodiments" or "in at least one of the various embodiments" as used herein does not necessarily refer to the same embodiment, though it may. Furthermore, the phrase "in another embodiment" or "in some embodiments" as used herein does not necessarily refer to a different embodiment, although it may. Thus, as described below, various embodiments may be readily combined, without departing from the scope or spirit of the innovations disclosed herein.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification and claims, the meaning of "a," "an," and "the" include plural references unless the context clearly dictates otherwise. The meaning of "in" includes "in" and "on."

The term "comprising" as used herein will be understood to mean that the list following is non-exhaustive and may or may not include any other additional suitable items, for example one or more further feature(s), component(s), element(s) and/or step(s) as appropriate.

At some recitations, the term "lance" may be understood to mean the (composite) tube insertable into melt, whilst at other recitations the term may be understood to mean the (composite) tube and its sleeve or shroud, as the context may indicate. In some contexts, the term "lance" may be any one or both of the aforementioned interpretations.

The term "melt" is used herein to refer to any molten material, including but not limited to molten metals, and includes both melts undergoing pyrometallurgical process(es) and sample melts taken for testing purposes. Yet further, "melt" is to be understood to include impurities, prills, inclusions (both endogenous and exogenous), slag or the like, although "melt" can also include melt of high purity.

In order to utilize known LIBS compositional measurement techniques with molten materials of high melting points, such as iron and steel, a refractory lance assembly and a refractory lance tube are proposed herein, in accordance with different embodiments, to meet certain implementation criteria. It is to be appreciated that implementation criteria may differ based on, for example, operating conditions or melt type, to name a few, and therefore different embodiments may meet one or more different implementation criteria. These implementation criteria are thus provided herein as non-limiting examples of implementation criteria, which may vary based on the use-case of the refractory lance tube and/or assembly.

For example, the lance may need to be resistant to high temperatures. The melting temperature of pure iron is 1537° C. However, in practice, temperatures of 1650° C. or more are often experienced during iron melts due to the difficulty of controlling the temperature of certain furnaces. At such high temperatures, mechanical strength may become the next requisite of the lance, as well as resistance to thermal shock. Any damage, cracks or leaks developing in the lance may allow air or gases (e.g. oxygen or nitrogen) to enter the lance (specifically here, the tube through which optical measurements are taken), altering the compositional measurement of the sensitive LIBS system and potentially affecting the spectral reading obtained. For the same reason, the lance may need to be resistant to corrosion by the molten material (typically metal) and/or molten slag. Corrosion resistance may be useful or requisite for other reasons too, including prolonging the lifespan of the lance. In this context, "corrosion" is to be interpreted broadly, including any one or more of corrosion, dissolution, erosion, chemical reactivity, or any process that may damage or destroy the lance. Corrosion further includes outgassing, which may occur as a result of chemical reactivity of one or more materials of the lance in the particular environment (due to oxidation of otherwise). Corrosion resistance may also ensure that the lance can be repeatedly utilized, to reduce the expense associated with the LIBS system.

The requirement of corrosion resistance may be further complicated by the fact that lance materials resistant to certain molten metals typically do not resist molten slag well. For example, molten steel is highly corrosive, however materials resistant to molten steel (i.e. acidic materials) typically do not resist molten slag (which is a basic material) well. Thus, a suitable material that is corrosive resistant in both molten material and slag may be required in some embodiments. Such corrosion resistance may be particularly relevant to portions of the lance which are immersible but may also be relevant to any sleeve or shroud which will also be placed within a furnace and exposed to similar conditions as the lance.

Further related to the requirement of corrosion resistance is the potential requirement of a lance to be chemically inert or at least, stable, at such high temperatures.

A further constraint on utilizing known LIBS compositional measurement techniques with molten materials of high melting points is that active cooling systems may generally be considered unacceptable or undesirous in the art or science due to safety concerns arising therefrom. A lance which can be utilised with metals of high melting temperatures but without utilising a cooling system may thus be desired or at least, provide a useful alternative to systems requiring cooling.

The embodiments, as described herein, provide different examples of a refractory lance assembly and a refractory lance tube, that can be utilised with optical sensing systems, such as LIBS, to obtain relatively accurate compositional measurements from metals having high melting temperatures. Indeed, some of these embodiments may resolve, or at least ameliorate, some of the drawbacks of conventions systems, by achieving one or more of the implementation criteria described above.

With reference to FIG. 1, and in accordance with one exemplary embodiment, a refractory lance assembly, generally referred to using the numeral 10, will now be described. The refractory lance assembly 10 can be utilised with an optical sensing system (see "LIBS", not shown in detail) to optically probe a melt 50, and specifically to acquire optical compositional measurements from the melt 50. The refractory lance assembly 10 generally comprises a composite tube 12 defining an optical path (indicated by broken lines) therethrough. The composite tube 12 comprises an immersion tube 14 (or first tube) having a first end (immersion tip) 14.1 which is immersible or insertable within or into the melt 50 and a second (opposed) end 14.2 to which an extension tube 16 (or second tube) is coupled to longitudinally extend its length. As such, the immersion tube 14 and the extension tube 16 form the composite tube 12, which is interchangeably referred to herein as a longitudinally extended composite tube.

As shown, the optical path, which is defined by the composite tube 12, is for optical alignment with the optical sensing system ("LIBS"). The composite tube 12 is further injectable, in use, with a pressurised inert fluid, specifically inert gas in this embodiment, to form an immersed melt surface 52 within the melt 50 via the first end or immersion tip 14.1 so to optically probe said immersed melt surface as exposed to said inert gas via the optical path. This optical path and insert gas path are described in further detail below.

The refractory lance assembly 10 further comprises a shroud 18 (or sleeve) encasing (i.e. surrounding) at least a junction or coupling between the first immersion tube 14 and the extension tube 16 at a spaced apart position to define an encasing volume 20 (or void) between the composite tube 12 and the shroud 18. The junction or coupling encased by the shroud 18 and encasing volume in this context may refer to the junction between the tubes 14, 16, or indeed the one or more components which form a coupling between the tubes 14, 16. In this embodiment, the shroud 18 encases (at least a part of) the composite tube 12 longitudinally, and the immersion tip 14.1 extends longitudinally therefrom for immersion with the melt 50. In use, the encasing volume 20 is injectable with and thus receives pressurised inert fluid, specifically inert gas (e.g. Argon gas), therein to mitigate fluid contamination of the composite tube 12 and immersed melt surface 52 via the coupling. For example, the inert gas can enter the optical path from the encasing volume 20 should a leak develop in the composite tube 12 (e.g. via the coupling, along the length of one of the tubes 14, 16, or otherwise), thereby preventing or mitigating potential external fluid contamination of the optical path.

As mentioned, the shroud 18 encases the composite tube 12 longitudinally. In particular, as shown in FIG. 1, the shroud 18 surrounds the composite tube 12 coaxially, extending from one end of the composite tube 12 along a length of the extension tube 16, and across the junction or coupling. In particular, the shroud 18 in this embodiment extends at least 1 or 2 inches (or 2 to 5 cm) beyond the junction or coupling, to cover the second end 14.2 of the immersion tube 14. In this regard, as noted above, the figures may not be drawn to scale and thus, the proportionate length of the shroud 18 relative to the composite tube 12 is not intended to be accurate.

In this embodiment, the refractory lance assembly 10 includes a coupling 22 arranged at the junction between the immersion tube 14 and the extension tube 16. Accordingly, the shroud 18 covers the coupling 22 and should a leak develop at the coupling 22, inert gas from the encasing volume 20 can ingress into the optical path.

In this embodiment, the immersion tube 14 and the extension tube 16 comprise tubes of differing lengths, with the immersion tube 14 being shorter than the extension tube 16. Such differing tube lengths may be advantageous, for example, where the immersion tube 14 is more expensive than the extension tube 16, or where the immersion tube 14 is exposed to greater corrosion or wear than the extension tube 16 (due to heat, reactivity with melt 50 or otherwise) and requires more frequent replacement. In this particular example, the immersion tube 14 is approximately 5 cm in length and the extension tube 16 is approximately 2 m in length, therefore the (extended) length of the extension tube 16 reduces the length of the immersion tube 14 required to reach the melt 50. Many alternative suitable lengths of the immersion tube 14 and the extension tube 16 may be utilised, and other embodiments may provide tubes of same or similar length.

The extension tube 16 has a coefficient of thermal expansion similar to the immersion tube 14. As known to skilled artisans, a coefficient of thermal expansion may in turn reflect distortion values with respect to temperature, and materials with low coefficients of thermal expansion (due to greater bond strength) have low distortion values. In this context, therefore, materials having similar coefficients of thermal expansion may include any two or more materials having similar bonding structures or, alternatively, any two or more materials having differing bonding structure but similar expansion and/or distortion properties. Further, in this context, a material having a low coefficient of thermal expansion may include any material falling on a lower end of a thermal expansion scale at a particular temperature (such as over 1500° C.). In this particular embodiment, the immersion tube 14 and the extension tube 16 are manufactured of one or more different refractory materials having low coefficients of thermal expansion. Thus, these one or more different refractory materials also exhibit low distortion values, thereby ensuring less expansion pressure is exerted on the junction and thus, the coupling 22, between the immersion tube 14 and the extension tube 16.

The immersion tube 14 and the extension tube 16 may be manufactured of one or more different refractory materials, which are capable of withstanding at least 1500° C. without incurring significant loss of mechanical strength, or corroding or otherwise degrading, and thus remaining usable for at least a predefined period (for example, a single thermal melt cycle, or at least two melt cycles). A plurality of different refractory materials and/or material combinations may be suitable in different embodiments, including but not limited to, non-porous ceramics and metals having high melting points. Effectively, by the immersion tube 14 and/or the extension tube 16 being manufactured from one or more different refractory materials which can withstand at least 1500° C., the refractory lance assembly 10 can be utilised in melts having high melting temperatures. However, only the immersion tube 14 in this embodiment need be capable of withstanding at least 1500° C., due to that fact that it is at least partially insertable into the melt 50 (indeed, it is only the immersion tip 14.1 which is immersed). In embodiments where the immersion tube 14 is comprised of more than one part, only the part to be inserted into the melt may need to be capable of withstanding at least 1500° C. This may include, for example, only the immersion tip 14.1.

In this embodiment, both the immersion tube 14 and the extension tube 16 are manufactured of one or more refractory materials resistant to corrosion and thermal shock. Such properties make possible the utilization of the refractory lance assembly 10 in applications with corrosive metals and/or in applications requiring extreme heat and/or repetitive thermal cycling. The term "corrosion" in this context may again be interpreted broadly, as provided above. Corrosion may include, for example, the formation and/or propagation of micro-cracks in the immersion tube 14 and the extension tube 16. In other examples, corrosion may include oxidation of the one or more refractory materials. Thermal shock may be experienced by the immersion tube 14 during insertion into the melt 50, whereas thermal shock may be experienced by the extension tube 16 upon being brought into the vicinity of the melt 50 and/or within a furnace in which the melt 50 is held (although not typically being inserted into the melt 50, as shown). Moving the refractory lance assembly 10 from an external environment typically under atmospheric temperature and pressure to inside the furnace and/or within the melt 50 at temperatures above 1500° C. may result in one or both of the immersion tube 14 and the extension tube 16 experiencing thermal shock. To preserve mechanical and/or chemical stability of the refractory lance assembly 10, it may be necessary that both of the immersion tube 14 and the extension tube 16 are resistant to thermal shock.

The one or more refractory materials of the immersion tube 14 and the extension tube 16 may have corrosion resistance and thermal shock resistance properties which differ. In particular, the immersion tube 14, which is at least partially insertable into the melt 50 at the immersion tip

14.1, may have higher corrosion resistance and thermal shock resistance as opposed to the extension tube 16, which is typically spaced apart from the melt 50 due to the length of the immersion tube 14 (and not inserted into the melt 50). The one or more refractory materials of the immersion tube 14 may be sufficiently resistant to corrosion and thermal shock to be insertable into melts of temperatures exceeding 1500° C. The one or more refractory materials of the extension tube 16, on the other hand, may be sufficiently resistant to corrosion and thermal shock to withstand temperatures directly above the melt 50 (i.e. without being inserted into the melt 50 at 1500° C.), typically being located at least partially inside the furnace in use.

In this particular embodiment, the second end 14.2 of the immersion tube 14 snugly receives a first end 16.1 of the extension tube 16 within it. The immersion tube 14 and the extension tube 16 have respective external and internal diameters to achieve this snug fit. This snug fit, which may form an interference fit, may form part of the coupling 22 and may at least partially seal the juncture between the immersion tube 114 and the extension tube 16. In other embodiments, the second end 14.2 of the immersion tube 14 may be snugly received within the first end 16.1 of the extension tube 16. In yet other embodiments, the immersion tube 14 and the extension tube 16 may have similar diameters, with ends of the respective tubes flushly abutting one another and the coupling 22 joining them. Indeed, various couplings of the composite tube 12 are envisaged without detracting from the general nature and scope of the instant disclosure.

Turning now to the immersion tube 14 (sometimes referred to as "immersion probe"), the immersion tip 14.1 (at a first end) of the immersion tube 14 is at least partially insertable into the melt 50, as shown. The immersion tube 14 has a length which may distance the shroud 18 and the coupling 22 from temperature exposure arising from or caused by the melt 50 and/or the furnace in which the refractory lance assembly 10 is inserted in use. In particular, neither the shroud 18 nor the coupling 22 is inserted into the melt 50, nor in any way come into contact with the melt 50. Advantageously, by ensuring the shroud 18 and coupling 22 remains distant from the melt 50, these parts may be less refractory, less corrosion resistant and/or less thermal shock resistant as compared to the immersion tube 14 and in particular, as compared to the immersion tip 14.1.

In this embodiment, the immersion tube 14 comprises a non-porous ceramic cylinder, with the immersion tip 14.1 being defined at the lower end thereof. Non-porous ceramics typically exhibit low coefficients of thermal expansion, having good mechanical strength at high temperatures and being both corrosion and thermal shock resistant. Non-porous ceramics present the further potential advantage of being generally impermeable. Although in this embodiment, the immersion tube 14 is circular in cross-section, it is to be appreciated that various other shapes (e.g. square, triangular, oblong, polygon) and/or dimensions of the immersion tube 14 may be envisaged for other embodiments. Greater thicknesses of the non-porous ceramic cylinder 14 will afford greater corrosive resistance, whereas lesser thicknesses will afford lesser corrosive resistance, and therefore the thickness of the non-porous ceramic cylinder 14 may be selected based on a particular intended application of the refractory lance assembly 10. In this embodiment, the non-porous ceramic cylinder 14 has a thickness of approximately 2 to 3 mm, with an internal diameter of approximately 20 mm and an external diameter of approximately 25 mm to 30 mm, specifically 24 mm to 26 mm. The external diameter of the non-porous ceramic cylinder 14 is such that it can mate with the extension tube 16, specifically fitting snugly over the first end 16.1 of the extension tube 16, as described above.

In this embodiment, the non-porous ceramic cylinder 14 comprises zirconia silicate boron nitride (ZSBN), comprising 45% zirconium dioxide (zirconia) in a matrix of boron nitride and borosilicate glass. The ZSBN is corrosive resistant and thermal shock resistant in temperatures exceeding 1500° C. In particular, the combination of zirconia, boron nitride and borosilicate glass in ZSBN may exhibit properties and/or characteristics superior over one or more of the individual components on their own, specifically relating to increased corrosion and thermal shock resistance. In particular, in this embodiment, ZSBN combines the corrosion resistance of zirconia with the thermal shock resistance of boron nitride, thereby producing a refractory material that has a low coefficient of thermal expansion, can withstand 1500° C. and is resistant to both corrosion and thermal shock.

As mentioned above, however, any suitable material(s) having a low coefficient of thermal expansion, as described, may provide workable alternatives to ZSBN for the immersion tube 14, including non-porous ceramics, for example. In other embodiments, the non-porous ceramic cylinder 14 may comprise, for example, boron nitride, boron nitride with at least 40% zirconium dioxide (zirconia) or ZSBN but comprised of a different percentage of zirconia and/or a different matrix composition.

The ZSBN composition of the immersion tube 14 in this embodiment may be, at least in part, advantageous over the prior art in that with general non-porous ceramics, the arguably obvious alternative to porous ceramics conventionally used to manufacture lances insertable in molten materials, typically lose structural integrity and melt at higher temperatures. For example, SiAlON and SiAlON II may be workable non-porous ceramics up to a range of approximately 1000° C. to 1200° C., however, exposure to temperatures exceeding this range may result in the lance losing structural integrity and melting. Other synthetic materials conventionally used may not withstand repetitive thermal cycling. Fused silica, for example, appears to withstand higher temperatures yet when tested, can only withstand one thermal cycle at high temperatures and only for a several minutes. Yet other conventionally used materials may not provide sufficient corrosion resistance at such high temperatures. Silicon carbide and graphite, for example, appear to have suitable thermal shock resistance but lack on corrosion resistance, dissolving in molten steel within a few minutes. Zirconia and magnesia, on their own, exhibit corrosion resistance but have poor thermal shock resistance, typically resulting in cracks or other damage to lances in use. Alumina on its own is similar, resisting corrosion but not thermal shock resistance. The ZSBN of the present embodiment, however, may have a low coefficient of thermal expansion allowing the immersion tube 14 to maintain structural integrity at high temperatures, specifically including temperatures above 1500° C., and is further resistant to both corrosion and thermal shock.

In another particular embodiment of the disclosure (not shown), the immersion tube 14 comprises a ceramic cylinder coated by an insulating non-porous ceramic layer on at least an end of the ceramic cylinder to be inserted in the melt 50. In this embodiment, the insulating non-porous ceramic layer may serve to thermally insulate the ceramic cylinder, reducing thermal shock experienced by the ceramic cylinder when inserted into the melt, and maintaining the structural integrity of the ceramic cylinder. In this embodiment, the insulating non-porous ceramic layer extends several inches along the length of the ceramic cylinder. In one embodiment, the ceramic cylinder is manufactured from aluminum oxide (alumina), and the insulating non-porous ceramic layer comprises zirconia silicate boron nitride (ZSBN), comprising 45% zirconium dioxide (zirconia) in a matrix of boron nitride and borosilicate glass. However, the insulating non-porous ceramic layer may be comprised of one or more other refractory non-porous ceramics capable of withstanding at least 1500° C., specifically resistant to corrosion and thermal shock at such temperatures, including, for example, boron nitride, boron nitride with at least 40% zirconium dioxide (zirconia) or ZSBN comprised of different constituents. One advantage of this alternative embodiment over the specific embodiment described above may be that less material capable of withstanding 1500° C. and being sufficiently corrosive and thermal shock resistant is required. In particular, only an insulating non-porous ceramic layer on a ceramic cylinder is required as opposed to a whole tube. Where a suitable non-porous ceramic material is expensive, coating another tube with the non-porous ceramic material may be more economically viable. The ceramic cylinder is typically coated on an external surface with the insulating non-porous ceramic layer, to prevent of corrosion of the ceramic cylinder when splatters of material from the melt reach it. Further techniques to improve adherence of the insulating non-porous ceramic layer to the ceramic cylinder may be used during the construction of the immersion tube, such as by a meshed bonding or the like, which are intended to fall well within the general scope and nature of the present disclosure. It is to be further appreciated that in other embodiments, the insulating non-porous ceramic layer may simply coat the immersion tip 14.1.

Returning to the present embodiment, with continued reference to FIG. 1, the coupling 22 is detachable and the immersion tube 14 is interchangeable with one or more alternative immersion tubes (not shown). In this embodiment, the one or more alternative immersion tubes have a composition identical to the immersion tube 14 and comprise ZSBN tubes. In other embodiments, the composition of the one or more alternative immersion tubes is similar or different to the immersion tube 14, depending for instance, on the intended application. The immersion tube 14 and the one or more alternative immersion tubes may include tubes of variable length, providing alternative immersion tube 14 lengths which can be coupled to the extension tube 16 by the coupling 22, for different intended applications, or the like.

Turning now to the extension tube 16 (sometimes referred to as "immersion lance" or "lance extender"), the extension tube 16 is sufficiently corrosive resistant to be reusable in two or more thermal cycles involving temperatures in excess of 1500° C. As provided above, the extension tube 16 has a coefficient of thermal expansion similar to the immersion tube 14. As the immersion tube 14 in this example comprises ZSBN, the extension tube 16 has a low coefficient of thermal expansion that is similar to the low coefficient of thermal expansion of ZSBN. In this embodiment, the extension tube 16 comprises a metal cylinder which is non-porous, thereby preventing any gas entering the optical path in use. Indeed, the non-porosity of the metal, in turn, contributes to the corrosion resistance of the extension tube 16. Most metals are also inherently thermal shock resistant.

It is to be appreciated that although in this embodiment, the extension tube 16 is circular in cross-section, various other shapes (e.g. square, triangular, oblong, polygon) and/or dimensions of the extension tube 16 may be envisaged for other embodiments. Further, the shape and/or dimension of the extension tube 16 need not match to the immersion tube 14. Greater thicknesses of the metal cylinder 16 will afford greater corrosive resistance, lesser thicknesses will afford lesser corrosive resistance, and therefore the thickness of the metal cylinder 16 may be selected based on a particular intended application of the refractory lance assembly 10. In this embodiment, the metal cylinder 16 has a thickness of approximately 2 to 3 mm, with an internal diameter of 24 to 26 mm and an external diameter of 28 to 32 mm, which can mate with the immersion tube 14, fitting snugly inside the second end 14.2 of the immersion tube 14, as described above.

In this embodiment, the metal cylinder 16 is specifically comprised of molybdenum. Molybdenum (Mo), which has a melting point of 2622° C., is relatively stable. In other embodiments, the metal cylinder 16 may be comprised of other suitable metals, including for example chromium, iridium, niobium, osmium, tungsten, tantalum or suitable alloys of molybdenum or any of the aforementioned metals. In yet other embodiments, the extension tube 16 comprises a non-porous ceramic cylinder manufactured of, for example, any one or both of SiAlON and SiAlON II. In yet further embodiments, the extension tube 16 may comprise a metal cylinder coated with a non-porous ceramic, or the like.

Turning now to the coupling 22, in this embodiment the coupling 22 is manufactured of a refractory material. As indicated above, the coupling 22 may not require heat resistance akin to the immersion tube 14, however, in this embodiment the coupling 22 is capable of withstanding heat inside the furnace. In particular, the coupling 22 in this example is manufactured of borosilicate or calcium borate.

In this particular embodiment, as shown in FIG. 1, the coupling 22 comprises a tube connector which is in the form of a ferrule disposed between the immersion tube 14 and the extension tube 16. The ferrule 22 includes an internal threaded surface (not shown) which engages complementary external threaded surfaces (now shown) on the immersion tube 14 and the extension tube 16. As such, in this embodiment, the immersion tube 14 and the extension tube 16 (which are snugly fit together) are received inside the ferrule 22 on opposing sides such that the ferrule 22 forms an insulating sleeve or sheath which covers the junction between the immersion tube 14 and the extension tube 16. Advantageously, this arrangement seals the junction at least partially, preventing any air contamination from entering the optical path of the composite tube 12 and potentially altering the representative surface of the bulk melt and/or the optical measurements taken by the optical sensing system ("LIBS"). Therefore, the composite tube 12 may be described as substantially impermeable or put differently, insulated. In some embodiments, the coupling 22 may include one or more seals to further seal the junction between the ferrule and one or both of the immersion tube 14 and the extension tube 16.

As provided above, in this embodiment, the coupling 22 (specifically, ferrule) defines a detachable coupling between the immersion tube 14 and the extension tube 16. Advantageously, such detachable coupling 22 allows replacement of the immersion tube 14 with a first replacement tube from the one or more alternative immersion tubes (not shown) when the immersion tube 14 has been corroded or worn, and in turn replacing the first replacement tube with a second replacement tube from the one or more alternative immersion tubes. In this embodiment, therefore, the refractory lance assembly 10 provides a reusable assembly for two or more thermal cycling rounds.

In other embodiments of the refractory lance 10, not shown here, a plurality of stacked ferrules can form the tube connector 22, to serve a similar function of joining the immersion tube 14 and the extension tube 16 and creating an insulating sleeve. In other embodiments, again not shown here, the coupling 22 may comprise a bond in the form of a ceramic-based bond, for example comprised of any one of: borosilicate or calcium borate, which is intended to fall well within the general scope and nature of the present disclosure. Where a bond is provided as the coupling 22, the immersion tube 14 is securely attached to the extension tube 16 and cannot be replaced (or is only replaceable with additional bond-dissolving steps). In other embodiments, the coupling 22 may comprise one or more fasteners. The one or more fasteners may comprise one or both of a nut and a key, or similar fastening means. In some embodiments, the coupling 22 may include a fastener (a nut or a key) in addition to one or more ferrules to provide a secured coupling between the immersion tube 14 and the extension tube 16. Various other components and/or configurations of the coupling 22 may be workable in further embodiments and are intended to fall within the nature and scope of the instant disclosure. Although the coupling 22 may create at least a partial seal at the junction in some embodiments, the coupling 22 need not create a sealed coupling (or impermeable seal) between the immersion tube 14 and the extension tube 16, as other complementary features may account for this.

Turning now to the optical path, in this embodiment the optical path provides an unobstructed path through the composite tube 12 through which an optical sensing means of the optical sensing system ("LIBS") may optically probe, or otherwise obtain optical measurements, from the melt 50 when in use. In this embodiment, as shown in FIG. 1, the optical path further defines a gas channel or gas flow path, which in use allows the flow of inert gas through the composite tube 12 for release at the first end 14.1 of the immersion tube 14 into the melt 50 to form a bubble 52 from which optical measurements can be measured by the optical sensing system. That is, inert gas can be injected via the composite tube to form an immersed melt surface within the melt (e.g. inner surface of bubble 52) such that optical probing of the melt 50 is isolated to this immersed melt surface under exposure to the injected inert gas. That is, optical measurements may be taken from an inner immersed melt surface of bubble 52 formed by the inert gas in the melt 50, thereby more accurately reflecting the melt 50 composition. As mentioned above, the gas bubbled into the melt 50 may be an inert gas, such as argon, which may not be reactive with or contaminate the melt 50. The argon may be further operable to remove contaminating particulate matter from the optical path, thereby maintaining accurate optical measurements. In this embodiment, argon enters the gas channel by means of an inlet 17 arranged at a top end of the refractory lance assembly 10, as shown. This inlet 17 may be connectable to an upstream pressurised inert fluid source (not shown). In some embodiments, not shown here, the refractory lance assembly 10 may include means to control the flow of insert gas, such as argon, into the gas channel defined by the composite tube 12. In particular, some embodiments may comprise means to maintain a relatively consistent pressure in the gas channel. Such means may include pressure valves or the like.

Turning now to the shroud 18, this is connected to the composite tube 12 by means of 2 or 3 screws in this embodiment (although various means for connecting the shroud 18 to the composite tube, at least at one end, are envisaged). Advantageously, in use, should a fracture, crack or other damage occur to the composite tube 12 (whether the immersion tube 14, extension tube 16 or coupling 22), causing a leak or break in seal, the inert gas in the encasing volume 20 may ingress therethrough and enter the optical path in the composite tube 12 due to a pressure differential (similar to Venturi effect). Accordingly, in this embodiment where the extension tube 16 comprises a metal and the immersion tube 14 comprises ZSBN, as described further below, the pressurised inert gas surrounding the coupling 22 in the encasing volume 20 may compensate for any differences in the natural expansion of the metal and the ZSBN, thereby avoiding any contamination of the optical path of the composite tube 12 through which optical measurements are obtained.

It is to be appreciated that, the at least partial seal resulting from the pressurized inert gas in the encasing volume 20 may reduce any requirement of the coupling 22 to seal the junction. In particular, although the coupling 22 may seal the junction at least partially, the pressurized inert gas in the encasing volume 20 may complement this by applying positive pressure externally such that if the coupling 22 does not create a seal, or if any leak in the coupling 22 develops, the pressurized inert gas in the encasing volume 20 will ingress therethrough (or be absorbed) into the optical path to prevent air contamination of the optical path (which may contaminate the representative surface of the bulk melt). It may be, therefore, that the shroud 18 and in use, the pressurized inert gas in the encasing volume 20, creates a secondary sealing means for the composite tube 12 in addition to the coupling 22.

In this embodiment, as shown in FIG. 1, the shroud 18 is a cylindrical body which encases or encapsulates the composite tube 12, specifically the extension tube 16, the coupling 22 and an upper part 14.2 of the immersion tube 14, as mentioned. In this embodiment, the shroud 18 has an internal diameter of approximately 40 mm to 50 mm. The shroud 18 is manufactured from one or more refractory materials, although as the shroud 18 may not be inserted into the melt 50 in typical use, it does not require corrosion and/or thermal shock resistance akin to the immersion tube 14. As shown, the immersion tube 14 extends beyond a lower edge of the shroud 18 such that in use, the shroud 18 is located above the melt 50 at a spaced-apart position.

The encasing volume 20 is formed between the composite tube 12 and the shroud 18, as described. Accordingly, a volume of the encasing volume 20 is dependent on the respective volumes of the composite tube 12 and the shroud 18. The shroud 18 is aligned coaxially around the composite tube 12, defining the encasing volume 20 therebetween. Notably, the encasing volume 20 may, in some embodiments, need to be sufficiently shaped and dimensioned to apply positive pressure on at least the coupling 22 when the inert gas is received therein. The refractory lance assembly 10 in this embodiment comprises an inlet 24 arranged in the shroud 18 through which the pressurised inert gas is receivable into the encasing volume 20. The inlet 24 is connectable to an upstream pressurised inert gas source (now shown). The refractory lance assembly 10 in this embodiment further comprises an outlet 26 arranged in the shroud 18, specifically at a lower end thereof, through which the pressurised inert gas is released from the encasing volume 20 to an external environment (externally to the refractory lance assembly 10). In this embodiment, therefore, the encasing volume 20 may specifically be considered a void. Any pressurised inert gas released from the encasing volume 20, via outlet 26, may settle or sink to an upper surface of the melt 50, thereby further reducing oxidisation potential of an upper exposed layer of the melt 50. Reducing oxidisation potential may, in some embodiments, further improve the accuracy of optical probing performed with LIBS.

In this particular embodiment, as mentioned above, the pressurised inert fluid comprises gas, specifically argon (Ar), and the upstream pressurised inert fluid source comprises a pressurised argon source. Therefore, as shown in this embodiment, the refractory lance assembly 10 includes two argon-containing channels, or argon flow paths, one which traverses the optical path and bubbles into the melt 50, and one which seals the junction between the immersion tube 14 and extension tube 16. Although argon is utilised in both channels or paths in this embodiment, it is to be appreciated, that any inert fluids (and potentially different fluids in each channel) may be workable in other embodiments. It is to be further appreciated that argon gas is heavier than air and therefore is expected to settle upon exiting the outlet 26, as noted above. Other relatively heavy inert gases may also be suitable for this purpose. Yet further, argon gas has a low thermal conductivity, and therefore is a better insulator as opposed to, for example, air. Other relatively insulating monotomic gases, or even combinations of gases, may also be suitable for this purpose.

One advantage of the present embodiment may include that the refractory lance assembly 10 does not require any cooling mechanism or cooling fluids to withstand temperature in excess of 1500° C. Both the composite tube 12 and the shroud 18 may be manufactured of refractory materials, with at least the immersion tube 14, or at the very least the immersion tip 14.1, being capable of withstanding temperatures in excess of 1500° C. As such, the pressurised inert gas, which in this embodiment is argon, need not be cooled to cool the refractory lance assembly 10. Nonetheless, it should be appreciated that compressed argon gas may provide a relatively low level of cooling in some embodiments, although not necessarily requisite to the operation of the refractory lance assembly 10.

Turning now to the optical sensing system, in this embodiment, the optical sensing system comprises a laser-induced breakdown spectroscopy (LIBS) system, as indicated in FIG. 1. More specifically, the refractory lance assembly 10 may be mechanically connected to a LIBS system at an optical window to obtain optical measurements in the form of LIBS compositional measurements from the melt 50. The LIBS system may include, for example, a laser source for emitting short, intense laser pulses (e.g. a flash lamp-pumped or diode-pumped solid state laser source with active Q-switching), an optical window through which the laser is emitted, a detection means (e.g. a line or 2-D camera, or an intensified charge-coupled device camera) on the same side of the optical window as the laser and at least one spectrometer to extract spectral information from detected radiation. Any components forming part of such mechanical connection to a LIBS system may also be resistant to heat, and may even be capable of withstanding temperatures in excess of 1500° C. Components capable of forming part of such mechanical connection may include, for example, a collar, a fastener, a seal or the like.

Skilled artisans will appreciate the sensitivity of LIBS systems generally and accordingly, will appreciate the advantage presented in ensuring the optical path of the composite tube 12 is not contaminated by any air, by means of both the coupling 22 and the encasing volume 20 with pressurised inert gas (specifically argon) which can enter the optical path of the composite tube 12 if any crack, leak or otherwise develops in use.

In use, the refractory lance assembly 10 may require preheating prior to inserting the immersion tube 14 into the melt 50 to, for example, prevent thermal shock. In this embodiment, the refractory lance assembly 10 is preheated by positioning the immersion tube 14 at a position just above the melt 50 (typically only a few millimeters above), within the furnace, and holding the refractory lance assembly 10 at the position for a predetermined period before slowly inserting the first end 14.1 of the immersion tube 14 (specifically, the immersion tip) into the melt 50 in order to commence bubbling and obtain LIBS compositional measurements. This preheating of the refractory lance assembly 10 may occur prior to activating the LIBS system to which the refractory lance assembly 10 is connected.

LIBS compositional measurements taken of the melt 50 (specifically, at the immersed melt surface of bubble 52) may include, for example, elemental composition and/or concentration which may be presented to operators as a spectral signature, or otherwise further processed to provide elemental composition and/or concentration in percentages, levels or the like. The compositional measurements may inform operators whether operational conditions are in order to produce a desired result (e.g., with reference to the composition and/or concentration of the melt) or whether adjustments to one or more operational conditions, such as temperature, are required. The LIBS compositional measurements may also include compositional measurements from one or more inclusions (not shown) in the melt 50. Inclusions typically include exogenous inclusions which in this example, may originate, for example, from slag, and endogenous inclusions arising during the melt process. In particular, the inclusions may include iron oxide, copper or nickel oxide, or any other solid intermetallic components, which are not soluble in the melt 50. Such inclusions may also include non-metallic inclusions. Obtaining LIBS compositional measurements from one or more inclusions in the melt 50 may indicate, at least in part, a purity or cleanliness of the melt 50. Notably, in this embodiment, it is not only the presence of inclusions which may be identifiable through the refractory lance assembly 10 in conjunction with the LIBS system, but also the specific composition of the inclusions, if desired. Identifying the composition of inclusions may inform the melt process, for example by exposing the melt 50 to certain temperature(s) to reduce inclusions.

In this embodiment, the melt 50 comprises at least partially molten metal. For example, the at least partially molten metal can be one or more of iron, steel, nickel, copper, platinum and alloys thereof. Specific application of the refractory lance assembly 10 is envisaged in the iron and steel industries, where melt temperatures in excess of 1500° C. are required. For example, the refractory lance assembly 10 may be utilised in steelmaking secondary metallurgy. As will be appreciated by skilled artisans upon reference to the disclosure, however, the refractory lance assembly 10 can be used to obtain LIBS compositional measurements from any metal with a high melting temperature. The refractory lance assembly 10 may have particular use in molten ferrous metals, for example, which are prone to oxidation which in turn, may impact sensitive LIBS measurements. As indicated, however, only an end or tip of the immersion tube 14 is immersed in the melt 50 in use, the end or tip typically contacting molten slag before reaching molten metal.

In this embodiment, the LIBS system further comprises an additional spectrometer arranged to monitor an oxygen spectral line (as part of a spectral profile) at the melt 50 (specifically, at the immersed melt surface of bubble 52). The oxygen spectral line will indicate, in some embodiments, the oxide formation in the melt 50, specifically at an interior surface of a bubble 52 in the melt 50. Knowledge of the oxygen ($O_2$) concentration may be relevant to inform operators of potential oxidation occurring (which may affect the LIBS system accuracy), allowing operators to take steps to prevent oxidation of the melt 50 whilst LIBS compositional measurements are obtained. Otherwise, where applicable, knowledge of oxygen concentration may be relevant to inform operators of melt properties to be expected in the melt 50 during or after a thermal cycle.

In this embodiment, the LIBS system can specifically utilise a 247.8 nm spectral line to measure carbon (C) concentration in steel, for example, which is an important in achieving desired properties of alloy steel and cast iron. As known to skilled artisans, carbon in steel can include mass fractions of less than 0.001% (or 10 µg/g) to more than 2% and spectrochemical determination at low levels is difficult, particularly in that the most sensitive lines are in the vacuum ultraviolet (VUV) wavelength range, requiring detection systems suited for these wavelengths, as well as vacuum or inert gas conditions to avoid strong absorption of the radiation. The immersion tube 14 of the refractory lance assembly 10, as described above, is inserted directly into the melt 50, thus minimising distance between the melt surface and detection, and the composite tube 12 is filled with argon, as described, to bubble into the melt 50, minimising oxidation of the melt surface. Advantageously, use of the 247.8 nm line, instead of for example a 193 nm line, may allow a long optical fiber to be used. In particular, it is known in atomic spectroscopy that carbon detection by atomic emission spectroscopy can be done by monitoring the carbon line at 193.1 nm or 247.8 nm. However, the 247.8 nm suffers from interference from an iron line, and whilst the 193 nm is free from interference, its transmission by fiber optics in LIBS suffers from absorption. In order to use the 247.8 nm, another iron line which has the same excitation level as the carbon line at 247.8 can be utilized. The carbon line 247.8 nm can be subtracted from the interfering line allowing its use by fiber optics, instead of relying on the 193 nm carbon line.

As mentioned above, specific application of the refractory lance assembly 10 is envisaged in the iron and steel industries. For example, the refractory lance assembly 10 may be utilised in steelmaking secondary metallurgy, such as in ladle metallurgy facilities (LMFs) and vacuum degassers (VDs). As the refractory lance assembly 10 can withstand the temperatures required in these processes, real-time continuous compositional measurements allows for better trending of alloy and flux use, and thus can lead to significant savings over time whilst also eliminating any turnaround time required to acquire and analyze each sample, before a batch can be cleared. To illustrate this, consider a typical batch with a cycle time of 40 mins, of which 4 mins are required to acquire and analyze a sample before the next process decision is made. In such a scenario, a productivity boost of up to 10% is possible when real-time continuous compositional measurements can be taken with the refractory lance assembly 10 coupled to LIBS. The refractory lance assembly 10 coupled to LIBS may be particularly useful in VDs, which generally cannot be physically sampled under a vacuum. In another example, the refractory lance assembly 10 may be utilised in blast furnace ironmaking, specifically for the compositional measurement of hot metal or pig iron in the blast furnace runner. Here, savings may be achieved through reduction in average hot metal silicon (Si) for hot metal production. These uses and advantages may be applicable to both the composite tube 12 itself, as well as the refractory lance assembly 10, and the other implementations described herein.

With reference now to FIGS. 2 to 6, and in accordance with a further exemplary embodiment, a refractory lance assembly generally referred to using the numeral 200, will now be described. The refractory lance assembly 200 in this embodiment is principally similar to the exemplary embodiment in FIG. 1 and therefore shared features will be omitted, where possible, for the sake of brevity. The refractory lance assembly 200, in this embodiment, includes a composite tube 108 (best shown in FIG. 3) that is substantially resistant to corrosion and thermal shock at temperatures of 1500° C. or more. The composite tube 108 defines an optical path 110 therethrough and comprises a immersion tube 102 (or first tube) having a first end 102.1 which is insertable into a melt, and a second end (opposing the first end) which is coupled an extension tube 104 (or a second tube) to longitudinally extend its length, and a coupling 106 arranged at a junction between the immersion tube 102 and the extension tube 104 to at least partially seal the junction.

The refractory lance assembly 200 further comprises a shroud 202 (or sleeve) surrounding at least a junction between the immersion tube 102 and the extension tube 104 at a spaced apart position to define an encasing volume 204 (or void) between the composite tube 108 and the shroud 202, in use receiving pressurised inert fluid therein such that said pressurised inert fluid can enter the optical path 110 from said encasing volume 204 should a leak develop in the composite tube 108, thereby preventing contamination of said optical path 110 so as to maintain consistent measurements. In this embodiment, the shroud 202 is again shown to cover the extension tube 104, the coupling 106 and the second end of the immersion tube 102. In some embodiments, not shown here, the shroud 202 may further include one or more seals, for example between the shroud 202 and the immersion tube 102, to create an airtight seal. Similar to the embodiment shown in FIG. 1, this assembly may at least partially seal the junction between the immersion tube 102 and the extension tube 104, typically covering at least one inch of the immersion tube 102 below the coupling 106. Other embodiments are envisaged, however, wherein the shroud 202 does not fully encase or cover the coupling 106, or the immersion tube 102, wherein the coupling 106 is expected to maintain sufficient seal.

In this embodiment, the immersion tube 102 and the extension tube 104 have similar coefficients of thermal expansion. The immersion tube 102 is manufactured wholly of non-porous ceramic in the form of zirconia silicate boron nitride (ZSBN), comprised of approximately 45% zirconia in a matrix of boron nitride and borosilicate glass, and the extension tube 104 (which has a length greater than the immersion tube) comprises a metal cylinder manufactured of molybdenum. In this particular embodiment, shown in FIGS. 2 to 6, the immersion tube 102 and the extension tube 104 have similar diameters, with ends of the respective tubes 102, 104 flushly abutting one another. The refractory lance assembly 10 may include one or more seals at this junction between the immersion tube 102 and extension tube 104.

In this embodiment, the composite tube 108 further comprises a coupler 106 arranged at the junction between said immersion tube 102 and said extension tube 104, in the form of a tube connector into which respective ends of the immersion tube 102 and the extension tube 104 are received to form an insulating sheath around said junction. The tube connector 106 is manufactured of either borosilicate or calcium borate.

In this embodiment, the inlet into the optical path 110 is indicated with reference numeral 206, that being where argon gas is injected into the refractory lance assembly 200 in this embodiment. In this embodiment, however, the shroud 202 is closed or sealed at the end proximate the immersion tube 102, such that the encasing volume 204 has a fixed or defined volume. As shown, the refractory lance assembly 200 further includes an outlet, indicated with reference numeral 208. In this embodiment, the outlet 208 includes a one-way pressure valve to release the argon gas from the encasing volume 204 to maintain a constant predetermined pressure within the encasing volume 204.

In this embodiment, reference numeral 300 refers broadly to the mechanical coupling used to connect the refractory lance assembly 200 to a LIBS system. It is to be appreciated that the mechanical coupling 300, and indeed the portion of the refractory lance assembly 200 encircled with indicator "E", are variable and may depend, for example, on the particular LIBS system to which the refractory lance assembly 200 will be coupling.

Figure 7:
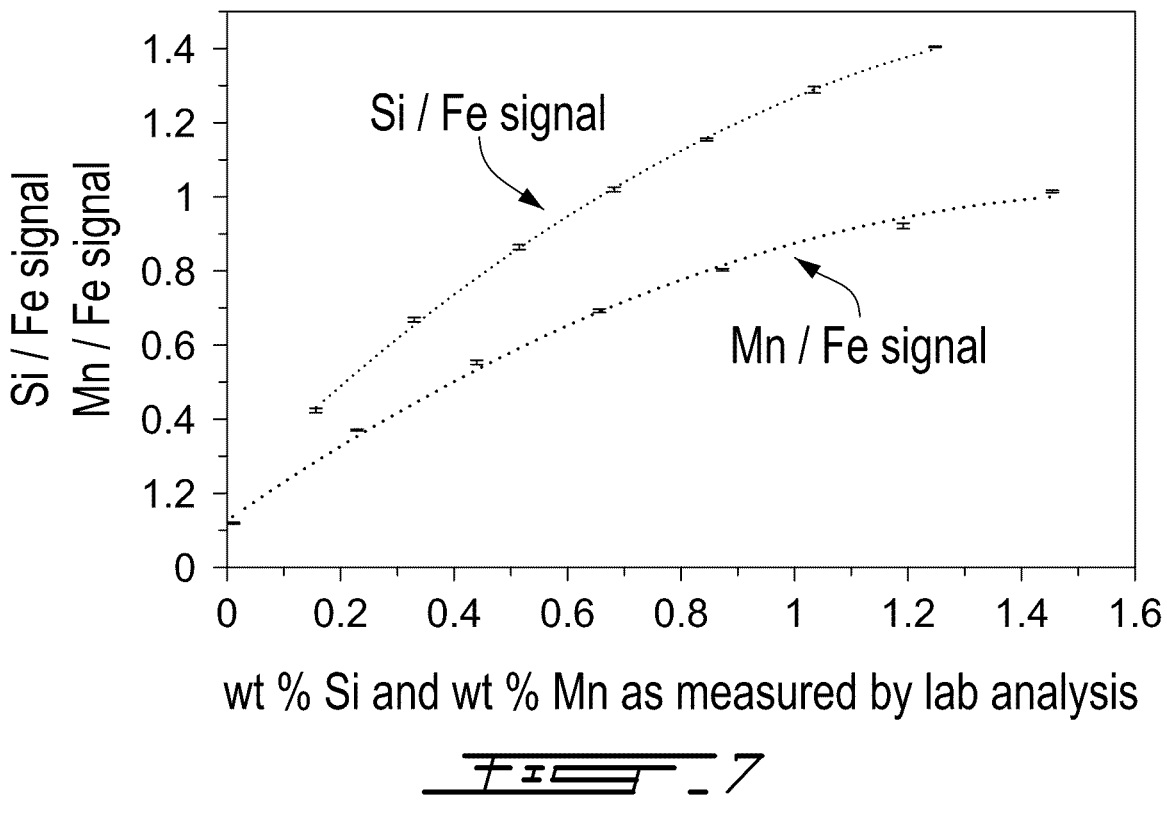
FIG. 7 is a graph of calibration curves obtained for a given melt sample on a first day of an experiment, where measurements were taken with a conventional laboratory technique (x-axis) and with LIBS using a refractory lance assembly (y-axis), in accordance with another embodiment, indicating that comparable results were obtained.
Figure 8:
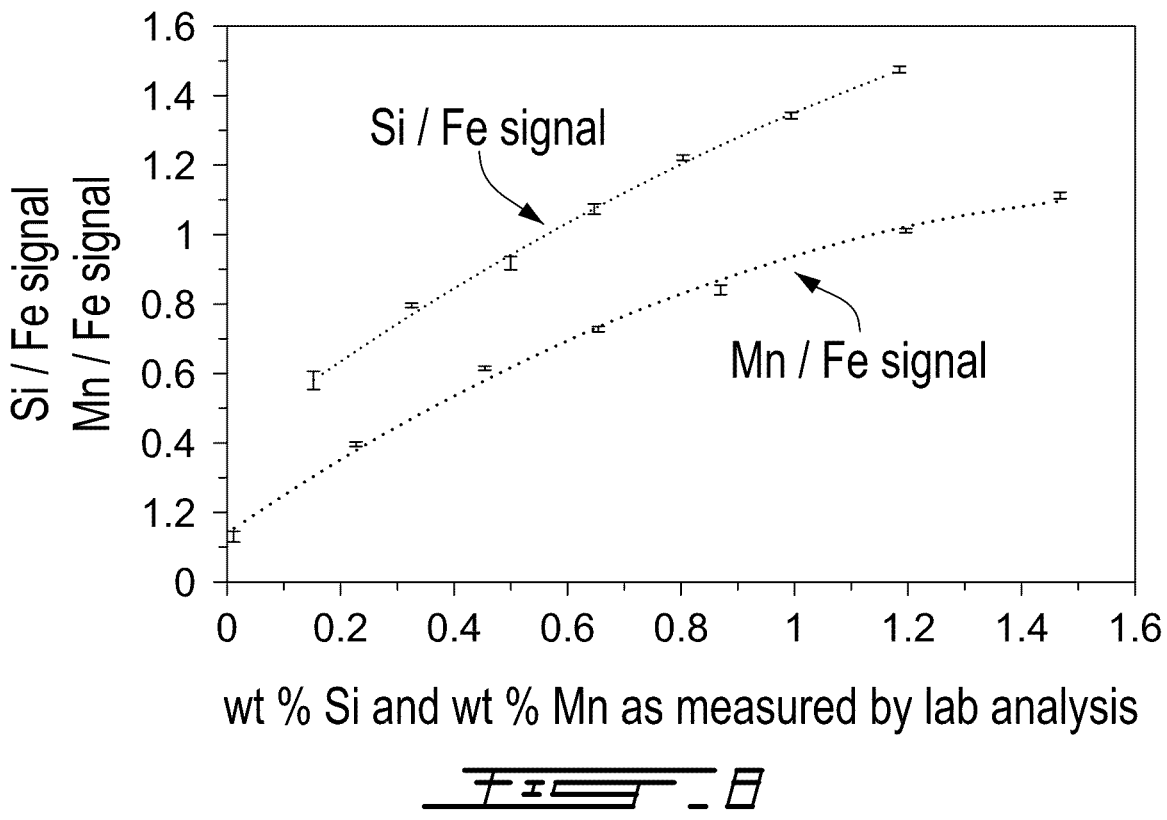
FIG. 8 is a graph of calibration curves obtained for the same given melt sample of FIG. 7 on a second day, again performed with the conventional laboratory technique (x-axis) and with LIBS using a refractory lance assembly (y-axis), with certain experimental set-up modifications, also indicating that comparable results were obtained.

Turning now to FIGS. 7 to 9, these graphs illustrate the comparability of compositional measurements taken from melts using conventional laboratory techniques ("lab analysis") and using a refractory lance assembly, in accordance with another embodiment, coupled to a LIBS system. The refractory lance assembly utilised for these experiments bears similarities with, but is not identical to, the embodiments illustrated in the earlier figures.

FIGS. 7 and 8 show test results from two days in a laboratory scale experimental set up for the ironmaking application, described above, specifically demonstrating utility by measuring silicon (Si) or manganese (Mn) in pig iron. The experimental set up consisted of an induction furnace for holding molten pig iron, and the refractory lance assembly 10, in accordance with one embodiment, coupled to a LIBS system, positioned above the induction furnace via a crane. The probe of the LIBS system consisted of a Q-switched Nd:YAG pulsed laser providing 300 mJ energy per pulse at 1064 nm wavelength. Optical fibers of the LIBS system would allow radiation emitted by plasma to be collected to be analyzed remotely using commercially available spectrometers. In this case, a Czerny-Turner spectrometer of 55 cm focal length equipped with a 3600 line/mm grating and an intensified charge-coupled device (CCD) camera was used to measure Si I at 288.16 nm and Mn II at 293.31 nm. In addition, the probe contained a custom-made vacuum ultraviolet (VUV) spectrometer for the measurement of carbon at 193.09 nm. As the wavelength decreased below approximately 200 nm, the radiation was increasingly blocked by oxygen in air and by optical fibers. Therefore, a spectrometer with direct line of sight to the plasma was installed to measure those wavelengths.

In this experiment, the procedure involved melting an initial charge of approximately 35 kg of pig iron in an induction furnace. The melted hot metal contained an initial concentration of approximately 0.15 wt % Si and 0.01 wt % Mn. The molten charge was brought up to a temperature of between 1480° C. to 1530° C. (measured via bath temperature measurement). The refractory lance assembly 10, specifically an end or tip of the immersion tube, was then lowered with the crane and positioned approximately 2" above the melt for a few minutes for preheating (no other preheating method was used). Once preheated, the end or tip of the immersion tube was inserted into the melt, the probe of the LIBS system was activated, allowing argon to flow through the composite tube to bubble into the melt, and compositional measurements were taken for at least 10 minutes, at a frequency of 2 laser pulses per second (2 Hz) from an internal bubble surface. Following this, the immersion tube was removed from the bath. A bath sample was taken for conventional laboratory compositional analysis, specifically, optimal emission spectroscopy (OES), and a temperature measurement was taken to ensure a constant bath temperature. Subsequently, bath additions of iron(II) sulphide (FeSi) and iron manganese (FeMn) were made to increase the concentration of elements of interest, and some time was taken to allow the additions to homogenize in the melt. This procedure was repeated several times (generally for at least 6 additions) and was terminated after approximately 2 hours of runtime at maximum temperature to ensure sufficient furnace lining integrity and safety.

As mentioned, FIGS. 7 and 8 specifically show the results from two days of testing as calibration curves. In both figures, as indicated thereon, the upper dotted curve reflects the Si/Fe signal, whilst the lower dotted curve reflects the Mn/Fe signal. The horizontal axis reflects concentration (wt %) of elements Si and Mn in the melt as determined with conventional sampling techniques, as described. The vertical axis reflects the concentration of the elements Si and Mn as directly determined with the refractory lance assembly coupled to the LIBS system, indicated as a ratio of photon counts measured at characteristic spectral lines. The photon counts measured at two chosen Si and Mn spectral lines are divided by the photon counts measured at corresponding Fe spectral lines, in accordance with a known normalizing procedure. In both FIGS. 7 and 8, the dotted curves correspond to second order polynomial least squares fits to the data. The vertical heights of the error bars correspond to 2 standard deviations (using an average of 100 spectra/50 seconds of measurement per data point). The results correspond to a measurement precision of ±0.008% and ±0.013% for the Si and Mn measurements, respectively.

Skilled artisans will appreciate that the calibration curve, once established, is the basis for the LIBS technique. For a given set of reference conditions (LIBS system configuration, optical geometry, approximate melt chemistry and temperature etc.), the calibration curve established can be used to determine the chemical composition of an arbitrary system using the photon counts measured at any point by the system. A careful comparison of the calibration curves for the two days shows that they are slightly offset. This is expected, as modifications were made to the experimental set-up between the two days. In particular, on the first day (FIG. 7), a refractory lance assembly measuring 29 inches (73.7 cm) long was used, while on the second day (FIG. 8), a refractory lance assembly measuring 24 inches (61.0 cm) was used. All else kept equal, a shorter refractory lance assembly focuses the laser pulse of the LIBS laser onto a smaller area, and hence can change the plasma temperature and relative photon emission intensity achieved. Further, the laser focal point on the bubble surface was set at a slightly different point between the two measurement days. Skilled artisans will appreciate that for a commercial system, these parameters are to be kept constant, or otherwise accounted for via multiple calibration curves (if varying these parameters offers design benefit). Notwithstanding this variation, FIGS. 7 and 8 illustrate the calibration curve trend of a direct relationship between measurements taken with conventional sampling techniques, and measurements taken in-line with the refractory lance assembly and LIBS system of the instant disclosure.

FIG. 9 is a graph of compositional measurements, specifically measurements of constituent concentration, for a given sample, performed with a conventional laboratory technique (horizontal axis) and with LIBS using a refractory lance assembly (vertical axis), in accordance with one embodiment, showing again that comparable results were obtained. In this particular experimental set up, the melt was copper-nickel matte. As indicated by the legend, different markers reflect compositional measurements taken for different elements of the copper-nickel matte, including specifically copper (Cu)—circles, nickel (Ni)—triangles, iron (Fe)—squares, cobolt (Co)—plus signs (+), and sulphur (S)—diamonds. The horizontal axis reflects concentration of the copper-nickel matte melt as determined with the conventional laboratory technique, specifically via acquiring a test sample from the copper-nickel matte melt, preparing the test sample and then conducting laboratory analysis. The vertical axis reflects the concentration of the copper-nickel matte as directly determined with the refractory lance assembly coupled to the LIBS system, thus in real-time and providing continuous measurement. As illustrated, the trend reflects a direct relationship between measurements taken with conventional sampling and measurements taken with the refractory lance assembly and LIBS system in real-time. The measurements taken with the refractory lance assembly and LIBS system are, however, in real-time, increasing efficiency by reducing analysis time to achieve the same result. Reducing analysis time, in turn, may reduce energy costs associated with analysis, particularly related to maintaining temperatures in the furnace. In addition, greenhouse gas emission may be reduced by the overall reduction in analysis time made available by the present disclosure to high temperature metallurgical processes.

FIGS. 7 to 9 thus illustrate that embodiments of the refractory lance assembly at least provide suitable alternatives to conventional laboratory techniques for obtaining compositional measurements. Furthermore, as will be appreciated by skilled artisans upon reference to this disclosure, embodiments of the refractory lance assembly may be utilized in extreme heat and may not suffer any significant air contamination (preserving a representative surface of the melt bulk) which would produce results different to conventional laboratory techniques.

Another aspect of the present disclosure (not shown) provides a refractory lance tube which comprises a tube having a first end comprised at least in part of a non-porous ceramic, which is substantially resistant to corrosion and thermal shock at temperatures of 1500° C. or more, said first end thus being insertable into a melt at temperatures of 1500° C. or more. In different embodiments, the non-porous ceramic comprises any one or more of: boron nitride, boron nitride with at least 40% zirconium dioxide (zirconia), or zirconia silicate boron nitride (ZSBN) comprised of approximately 45% zirconia in a matrix of boron nitride and borosilicate glass. The refractory lance tube may be received into a shroud or sleeve such that the first end of the tube protrudes from the shroud or sleeve, to provide a refractory lance assembly, as described above.

Accordingly, in some embodiments, a refractory lance assembly and refractory lance tube which are suitable for use with molten materials of high temperatures may be provided. In some embodiments, a refractory lance assembly and refractory lance tube which can withstand temperatures of 1500° C. or more may be provided. The refractory lance assembly and refractory lance tube may be sufficiently heat resistant to not require an active cooling system, improving safety during operation. Embodiments of the refractory lance assembly and refractory lance tube may be capable of use in the iron or steel industries, and/or of use in furnaces with difficult temperature control. In some embodiments, a refractory lance assembly and refractory lance tube which is impermeable and presents sufficient mechanical strength to avoid damage, cracks or leak formations during use in high temperatures may be provided. In addition, in some embodiments, the refractory lance assembly and refractory lance tube may be resistant to thermal shock, as well as resistant to corrosion by molten metals and/or molten slag. In some embodiments, the refractory lance assembly and refractory lance tube may be substantially chemically stable at high temperatures. For example, the refractory lance assembly and refractory lance tube may not oxidize at high temperatures. Advantageously, in addition to the aforementioned advantages, the refractory lance assembly and refractory lance tube is reusable in some embodiments and can be repeatedly utilized over more than one thermal cycle. This reusability may reduce the expense associated with the LIBS system and/or the metal processing or monitoring.

Further embodiments of the refractory lance assembly and the refractory lance tube disclosed herein are envisaged wherein the refractory lance assembly or tube is provided as part of a refractory lance kit (not shown). One exemplary kit may comprise an immersion tube, a detachable coupling and a plurality of variable length extension tubes. Another exemplary kit may comprise a plurality of immersion tubes, a detachable coupling, and a multiple-use extension tube. The kit may or may not include therewith a shroud or sleeve as disclosed herein in different embodiments.

It is to be appreciated that the various embodiments of the refractory lance assembly and the refractory lance tube disclosed herein may form part of a larger, optical sensing or probing system, such as a LIBS system. In one embodiment, there may be provided a LIBS system operational to measure constituent elements of melt at high operating temperatures, the LIBS system comprising any one or more of: a refractory lance assembly which is immersible in the melt (having features similar to any of the embodiments described above); a laser source for emitting short, intense laser pulses; an optical window through which the laser is emitted into the optical path of the refractory lance assembly; a detection means on the same side of the optical window as the laser; and at least one spectrometer to extract spectral information from detected radiation (in some embodiments, multiple spectrometers to extract different spectral information). Such broader LIBS systems are envisioned as forming a further aspect of the instant disclosure.

Other embodiments of the instant disclosure may further be directed to methods of optically probing or measuring constituent elements of a melt (not shown). In one embodiment, there may be provided a method of probing constituent elements of a melt, which comprises the broad steps of:

providing a refractory lance assembly, comprising a composite tube and a shroud at least partially encasing the composite tube, the composite tube comprising an immersion tube, an extension tube and optionally, a coupler between them;

preheating the refractory lance assembly such that at least an immersion tip of the immersible tube is preheated;

inserting the immersible tip of the immersible tube into the melt, whilst simultaneously injecting inert gas between the composite tube and the shroud.

In some embodiments of the method, the insert gas may also to injected through the composite tube to bubble at the immersion tip to form an immersed melt surface for probing. In some embodiments, the method may include the step of replacing the immersion tube with a replacement immersion tube after showing corrosion, cracking or other wear, the extension tube typically being reusable in one or more thermal cycles.

All of the aforementioned advantages further culminate to provide a method of obtaining real-time inline and direct (or in situ) compositional measurements of molten metal (which is not oxidised) at high temperatures without the time delays and errors introduced with conventional sampling techniques used for such high melting point metals.

The embodiments of the present disclosure present various advantages over the prior art. The advantages set forth herein are not intended to provide an exhaustive list, but merely illustrate at least some of the advantages conceived. Skilled artisans may conceive further advantages and/or applications of the present disclosure which are intended to fall well within the general scope and nature of the present disclosure.

While the present disclosure describes various embodiments for illustrative purposes, such description is not intended to be limited to such embodiments. On the contrary, the applicant's teachings described and illustrated herein encompass various alternatives, modifications, and equivalents, without departing from the embodiments, the general scope of which is defined in the appended claims. Except to the extent necessary or inherent in the processes themselves, no particular order to steps or stages of methods or processes described in this disclosure is intended or implied. In many cases the order of process steps may be varied without changing the purpose, effect, or import of the methods described.

Information as herein shown and described in detail is fully capable of attaining the above-described object of the present disclosure, the presently preferred embodiment of the present disclosure, and is, thus, representative of the subject matter which is broadly contemplated by the present disclosure. The scope of the present disclosure fully encompasses other embodiments which may become apparent to skilled artisans, and is to be limited, accordingly, by nothing other than the appended claims, wherein any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are intended to be encompassed by the present claims. Moreover, no requirement exists for a system or method to address each and every problem sought to be resolved by the present disclosure, for such to be encompassed by the present claims. Furthermore, no element, component, or method step in the present disclosure is intended to be dedicated to the public regardless of whether the element, component, or method step is explicitly recited in the claims. However, that various changes and modifications in form, material, work-piece, and fabrication material detail may be made, without departing from the spirit and scope of the present disclosure, as set forth in the appended claims, as may be apparent to those of ordinary skill in the art, are also encompassed by the disclosure.

What is claimed is:

1. A refractory lance assembly to be utilised with an optical sensing system to optically probe a melt, the refractory lance assembly comprising:
   an immersion tube having an immersion tip immersible within the melt and an extension tube coupled at an opposed end thereof to form a longitudinally extended composite tube defining an optical path therein for optical alignment with the optical sensing system, wherein said longitudinally extended composite tube is injectable, in use, with an inert gas to form an immersed melt surface within the melt via said immersion tip so to optically probe said immersed melt surface as exposed to said inert gas via said optical path, wherein said immersion tube is formed of a longitudinal sidewall that is continuous in that it has no slot, slit, nozzle, or opening extending through said immersion tip; and
   a shroud longitudinally encasing said longitudinally extended composite tube to define an encasing volume therebetween, wherein coupling of said extension tube with said opposed end of said immersion tube is encased within said encasing volume whereas said immersion tip extends longitudinally therefrom for immersion within the melt, wherein said encasing volume is injectable with said inert gas to mitigate fluid contamination of said longitudinally extended composite tube and immersed melt surface via said coupling.

2. The refractory lance assembly of claim 1, wherein said shroud coaxially encases said longitudinally extended composite tube.

3. The refractory lance assembly of claim 1, wherein said shroud longitudinally extends beyond said coupling toward said immersion tip by at least one inch.

4. The refractory lance assembly of claim 1, wherein said immersion tube and said extension tube have similar coefficients of thermal expansion.

5. The refractory lance assembly of claim 1, wherein said immersion tube is corrosion resistant and thermal shock resistant to maintain structural integrity at a temperature of at least 1500° C., whereas said extension tube is defined by a comparatively lower corrosion and thermal shock resistance.

6. The refractory lance assembly of claim 1, wherein said immersion tube comprises a non-porous ceramic cylinder.

7. The refractory lance assembly of claim 6, wherein said non-porous ceramic cylinder is manufactured of any one of: boron nitride, boron nitride with at least 40% zirconium dioxide (zirconia), or zirconia silicate boron nitride (ZSBN) comprising approximately 45% zirconia in a matrix of boron nitride and borosilicate glass.

8. The refractory lance assembly of claim 1, wherein at least said immersion tip of said immersion tube comprises a ceramic cylinder coated by an insulating non-porous ceramic layer.

9. The refractory lance assembly of claim 8, wherein said ceramic cylinder comprises aluminum oxide (alumina) and wherein said insulating non-porous ceramic layer is manufactured of any one of: boron nitride, boron nitride with at least 40% zirconia, or ZSBN comprising approximately 45% zirconia in a matrix of boron nitride and borosilicate glass.

10. The refractory lance assembly of claim 1, wherein said extension tube comprises a metal cylinder manufactured of any one or more of: molybdenum, chromium, iridium, niobium, osmium, tungsten, tantalum, or alloys thereof.

11. The refractory lance assembly of claim 1, wherein said extension tube comprises a non-porous ceramic cylinder manufactured of any one or both of: SiAlON, or SiAlON II.

12. The refractory lance assembly of claim 1, wherein said longitudinally extended composite tube further comprises a coupler at said coupling between said immersion tube and said extension tube, wherein said coupler is manufactured of any one or both of: borosilicate, or calcium borate.

13. The refractory lance assembly of claim 1, wherein said longitudinally extended composite tube further comprises a coupler at said coupling between said immersion tube and said extension tube, wherein said coupler comprises one or more ferrules into which ends of said immersion tube and said extension tube can be received such that said one or more ferrules form an insulating sheath covering said coupling.

14. The refractory lance assembly of claim 1, wherein said inert gas within said encasing volume is pressurized to release toward the melt to reduce melt surface oxidation.

15. A refractory lance tube to be utilised with an optical sensing system for optically probing a melt, comprising:

an immersion tube having an immersion tip immersible within the melt, and an extension tube coupled at an opposed end thereof to form a longitudinally extended composite tube defining an optical path therein for optical alignment with the optical sensing system;

wherein said longitudinally extended composite tube is injectable, in use, with an inert gas to form an immersed melt surface within the melt via said immersion tip so to optically probe said immersed melt surface as exposed to said inert gas via said optical path;

wherein said immersion tube is at least partially manufactured of a non-porous ceramic, which is substantially resistant to corrosion and thermal shock at temperatures of at least 1500° C.; and wherein said immersion tube is formed of a longitudinal sidewall that is continuous in that it has no slot, slit, nozzle, or opening extending through said immersion tip.

16. The refractory lance tube of claim 15, wherein said non-porous ceramic comprises any one or more of: boron nitride, boron nitride with at least 40% zirconium dioxide (zirconia), or zirconia silicate boron nitride (ZSBN) comprised of approximately 45% zirconia in a matrix of boron nitride and borosilicate glass.

17. The refractory lance tub of claim 15, wherein said extension tube is manufactured of a metal.

18. The refractory lance tube of claim 17, wherein said metal comprises any one or more of: molybdenum, chromium, iridium, niobium, osmium, tungsten, tantalum, or alloys thereof.

19. The refractory lance tube of claim 15, wherein said longitudinally extended composite tube further comprises a coupler between said immersion tube and said extension tube, wherein said coupler is manufactured of any one or both of: borosilicate, or calcium borate.

20. The refractory lance tube of claim 15, wherein said immersion tube comprises an aluminum oxide (alumina) tube at least partially coated at said immersion tip with said non-porous ceramic.

* * * * *